United States Patent
Ohue et al.

(10) Patent No.: US 9,961,737 B2
(45) Date of Patent: May 1, 2018

(54) SYSTEM, INFORMATION PROCESS APPARATUS AND INFORMATION PROCESSING METHOD

(71) Applicants: Yuji Ohue, Kanagawa (JP); Kiriko Chosokabe, Kanagawa (JP); Kazunari Tonami, Kanagawa (JP); Akira Murakata, Kanagawa (JP); Akiyoshi Nakai, Kanagawa (JP); Hideaki Iijima, Kanagawa (JP); Yushi Miyata, Kanagawa (JP)

(72) Inventors: Yuji Ohue, Kanagawa (JP); Kiriko Chosokabe, Kanagawa (JP); Kazunari Tonami, Kanagawa (JP); Akira Murakata, Kanagawa (JP); Akiyoshi Nakai, Kanagawa (JP); Hideaki Iijima, Kanagawa (JP); Yushi Miyata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/442,343

(22) Filed: Feb. 24, 2017

(65) Prior Publication Data

US 2017/0257921 A1 Sep. 7, 2017

(30) Foreign Application Priority Data

Mar. 4, 2016 (JP) .................................. 2016-042754

(51) Int. Cl.
*H05B 37/02* (2006.01)
*H05B 39/04* (2006.01)
(Continued)

(52) U.S. Cl.
CPC ........ *H05B 33/0854* (2013.01); *G01J 1/0219* (2013.01); *G01J 1/0228* (2013.01);
(Continued)

(58) Field of Classification Search
None
See application file for complete search history.

(56) References Cited

U.S. PATENT DOCUMENTS

2007/0217780 A1* 9/2007 Hirooka .................. G06T 7/593
  396/287
2013/0226320 A1* 8/2013 Berg-Sonne ........... G05B 15/02
  700/90

(Continued)

FOREIGN PATENT DOCUMENTS

JP 2013-093103 5/2013

*Primary Examiner* — Anh Tran
(74) *Attorney, Agent, or Firm* — Oblon, McClelland, Maier & Neustadt, L.L.P.

(57) ABSTRACT

A system in accordance with the present disclosure comprises a sensor and an information processing apparatus that includes processing circuitry. The sensor is installed on a surface so that a detection direction of the sensor is at a non-zero angle from a line normal to the surface. The processing circuitry is configured to communicate with the sensor, calculate a position of a detection area, in which the sensor detects an object in a predetermined space, according to the non-zero angle and a location of the sensor on the surface, and create correspondence information that associates an area of the predetermined space with the detection area.

18 Claims, 25 Drawing Sheets

(51) Int. Cl.
*H05B 41/36* (2006.01)
*H05B 33/08* (2006.01)
*G01J 5/12* (2006.01)
*G01J 5/00* (2006.01)
*G01J 5/02* (2006.01)
*G01J 1/02* (2006.01)
*G01J 1/32* (2006.01)
*G01J 5/10* (2006.01)
*G01J 5/08* (2006.01)
*G01J 1/42* (2006.01)

(52) U.S. Cl.
CPC ............ *G01J 1/0242* (2013.01); *G01J 1/0266* (2013.01); *G01J 1/32* (2013.01); *G01J 1/4228* (2013.01); *G01J 5/0025* (2013.01); *G01J 5/025* (2013.01); *G01J 5/026* (2013.01); *G01J 5/0275* (2013.01); *G01J 5/089* (2013.01); *G01J 5/0846* (2013.01); *G01J 5/10* (2013.01); *G01J 5/12* (2013.01); *H05B 37/0272* (2013.01); *G01J 2005/0077* (2013.01)

(56) References Cited

U.S. PATENT DOCUMENTS

| | | |
|---|---|---|
| 2013/0234893 A1 | 9/2013 | Kusakari et al. |
| 2015/0120360 A1* | 4/2015 | Adriaenssens . G06Q 10/063116 705/7.16 |
| 2016/0088696 A1 | 3/2016 | Kizaki et al. |
| 2016/0088706 A1 | 3/2016 | Kizaki et al. |

* cited by examiner

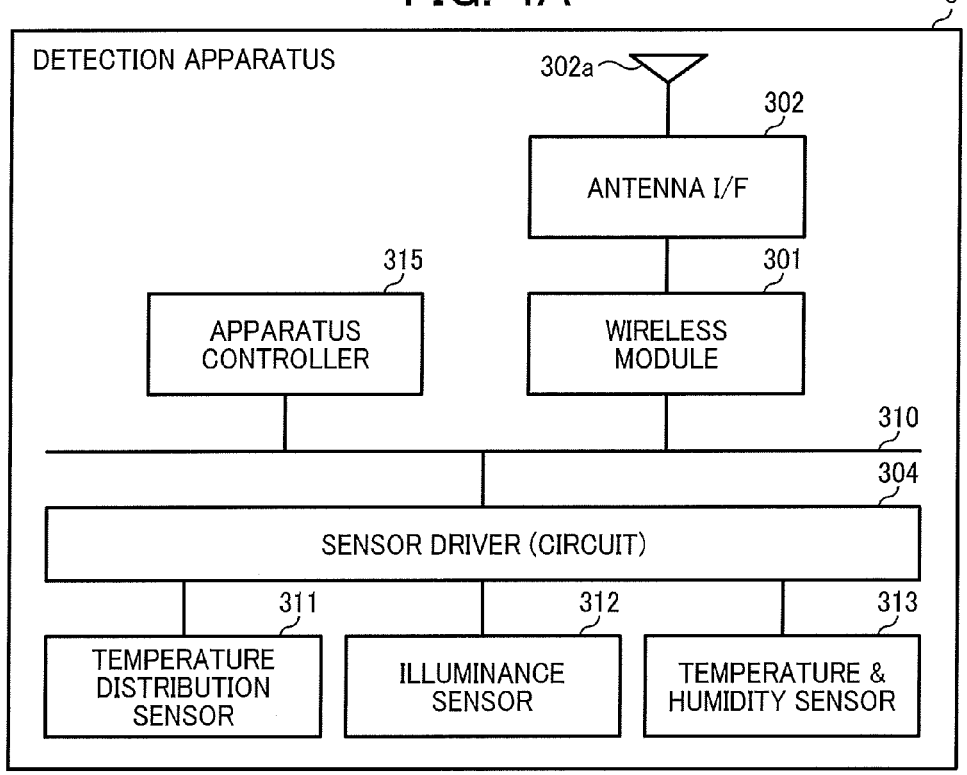
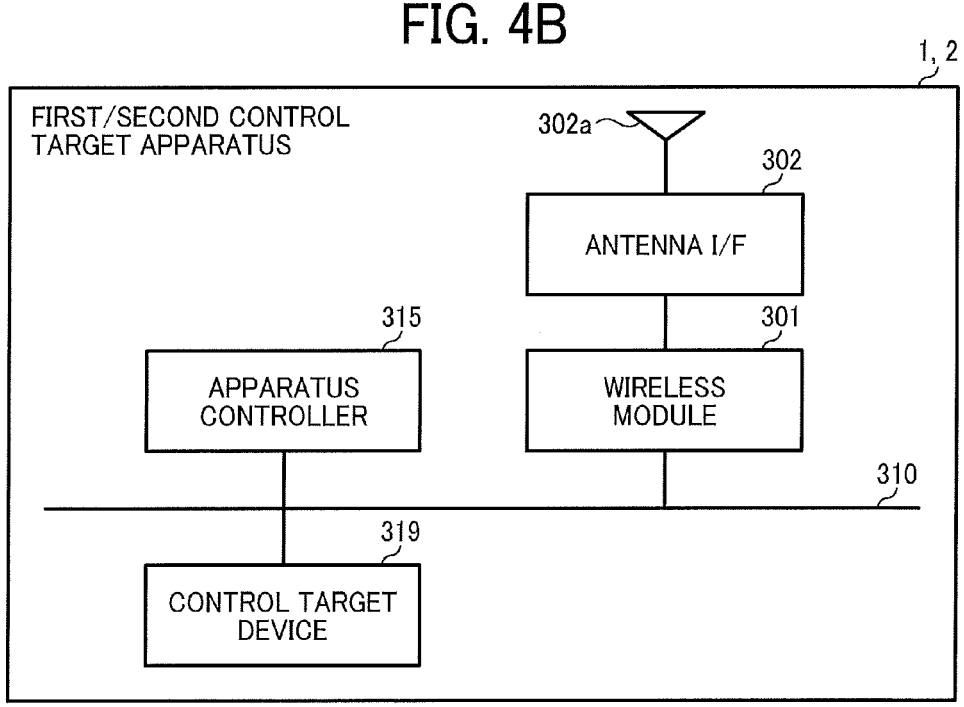

| a11 | a12 | a13 | b11 | b12 | b13 | c11 | c12 | c13 |
|-----|-----|-----|-----|-----|-----|-----|-----|-----|
| a21 | a22 | a23 (×11) | b21 | b22 | b23 | c21 (×12) | c22 | c23 |
| a31 | a32 | a33 | b31 | b32 | b33 | c31 | c32 | c33 |
| d11 | d12 | d13 | e11 | e12 | e13 | f11 | f12 | f13 |
| d21 | d22 | d23 (×21) | e21 | e22 | e23 | f21 (×22) | f22 | f23 |
| d31 | d32 | d33 | e31 | e32 | e33 | f31 | f32 | f33 |

HALLWAY Y

FIG. 8A

| HEAT SOURCE | LIGHT OUTPUT (%) |
|---|---|
| 1 | 100 |
| 0 | 60 |

FIG. 8B

| TEMPERATURE GAP + HUMIDITY / POPULATION DENSITY (%) | ... | −T1°C − −T2°C HUMIDITY H < 1% | −T1°C − −T2°C HUMIDITY H ≤ 1% | ... |
|---|---|---|---|---|
| 80 − 100 | ... | −1°C | −1°C | ... |
| 60 − 79 | ... | TARGET | TARGET | ... |
| 20 − 59 | ... | +1°C | DRY | ... |
| 1 − 19 | ... | +2°C | DRY | ... |
| 0 | ... | OFF | OFF | ... |

FIG. 9

| SECOND CONTROL TARGET APPARATUS ID | AREA ID (FIRST CONTROL TARGET APPARATUS ID) |
|---|---|
| x11 | a12, a13, a22, a23, a32, a33, b11, b21, b31 |
| x12 | b13, b23, b33, c11, c12, c21, c22, c31, c32 |
| x21 | d12, d13, d22, d23, d32, d33, e11, e21, e31 |
| x22 | e13, e23, e33, f11, f12, f21, f22, f31, f32 |

FIG. 10A

| AREA ID | COORDINATES OF DIAGONAL VERTEX |
|---|---|
| a11 | (0, 0) – (100, 100) |
| a21 | (0, 100) – (100, 200) |
| a31 | (0, 200) – (100, 300) |
| d11 | (0, 300) – (100, 400) |
| ⋮ | ⋮ |

FIG. 10B

| CELL ID | AREA ID |
|---|---|
| M001 | a11 |
| M002 | a21 |
| M003 | a21 |
| M004 | a31 |
| ⋮ | ⋮ |

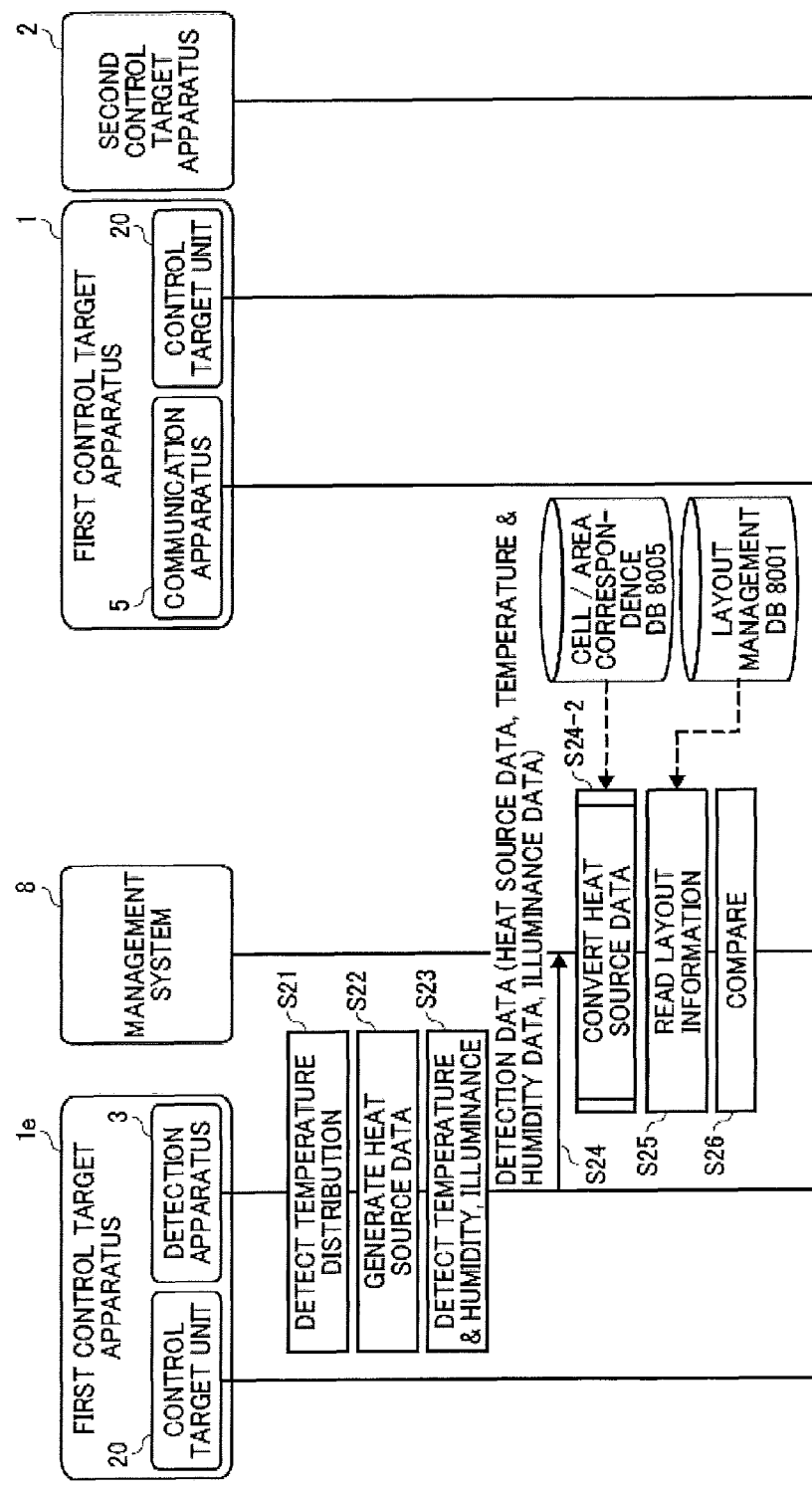

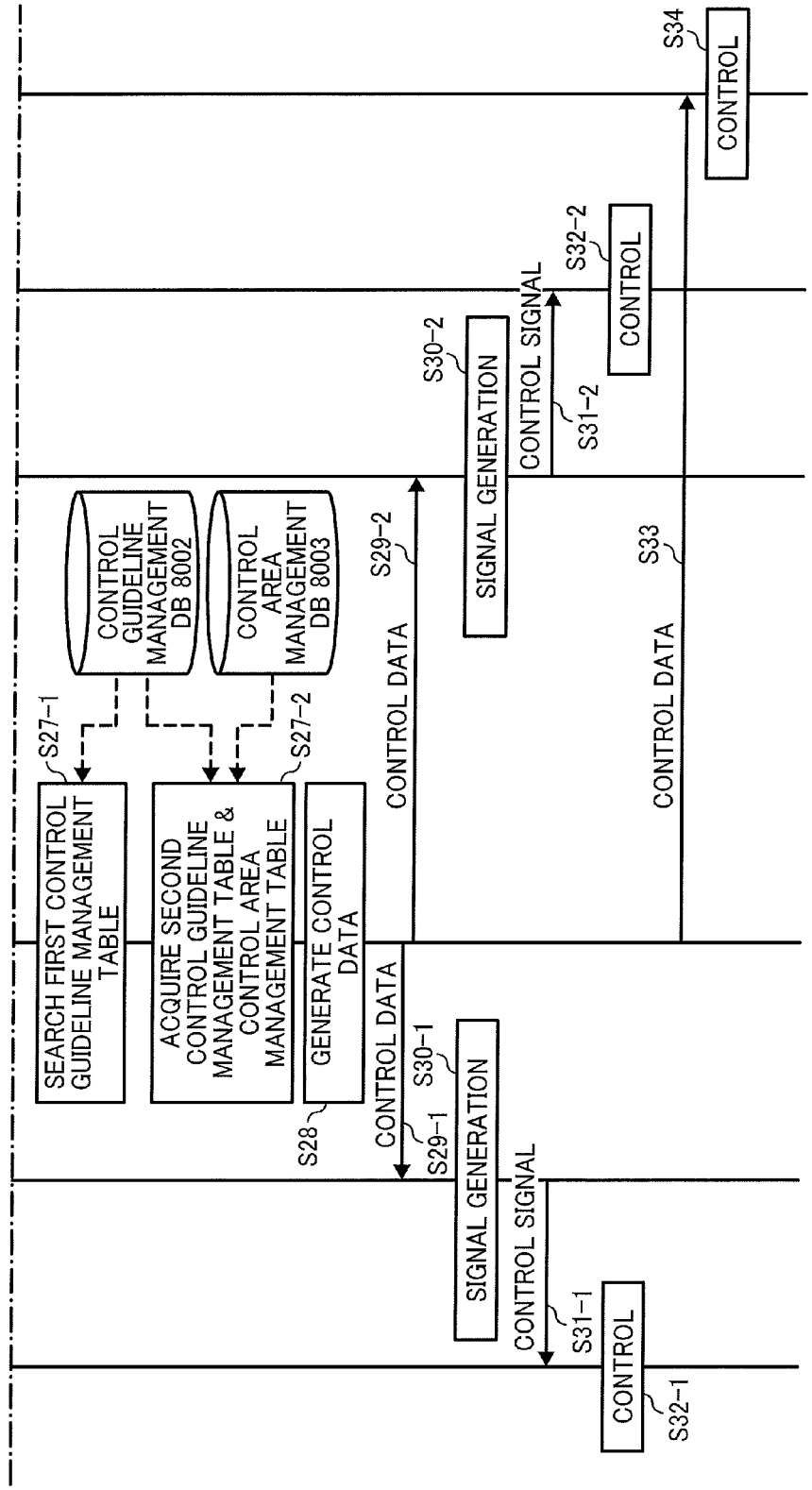

FIG. 12A

| 32°C (a11) | 25°C (a12) | 25°C (a13) |
|---|---|---|
| 32°C (a21) | 25°C (a22) | 32°C (a23) |
| 24°C (a31) | 24°C (a32) | 31°C (a33) |

FIG. 12B

| 1 | 0 | 0 |
|---|---|---|
| 1 | 0 | 1 |
| 0 | 0 | 1 |

FIG. 13

| 1 | 0 | 0 | 0 | 0 | 1 | 0 | 0 | 0 |
|---|---|---|---|---|---|---|---|---|
| 1 | 0 | 1 | 0 | 0 | 1 | 0 | 0 | 0 |
| 0 | 0 | 1 | 0 | 0 | 1 | 0 | 0 | 1 |
| 0 | 0 | 0 | 0 | 0 | 1 | 0 | 0 | 1 |
| 0 | 0 | 0 | 0 | 0 | 1 | 0 | 0 | 1 |
| 0 | 0 | 0 | 0 | 0 | 0 | 0 | 0 | 0 |

FIG. 22

| FIRST CONTROL TARGET APPARATUS ID | AREA ID | |
|---|---|---|
| | 100% (INSIDE) | 60% (OUTSIDE) |
| 1-11 | ... | ... |
| 1-12 | ... | ... |
| 1-13 | ... | ... |
| 1-14 | ... | ... |
| 1-15 | (4, 4) (4, 5) (4, 6)<br>(5, 4) (5, 5) (5, 6)<br>(6, 4) (6, 5) (6, 6) | (2, 3) (2, 4) (2, 5) (2, 6) (2, 7)<br>(3, 3) (3, 4) (3, 5) (3, 6) (3, 7)<br>(4, 3) (4, 7)<br>(5, 3) (5, 7)<br>(6, 3) (6, 7)<br>(7, 3) (7, 4) (7, 5) (7, 6) (7, 7)<br>(8, 3) (8, 4) (8, 5) (8, 6) (8, 7) |
| 1-16 | ... | ... |
| ⋮ | ⋮ | ⋮ |

SYSTEM, INFORMATION PROCESS APPARATUS AND INFORMATION PROCESSING METHOD

CROSS-REFERENCE AND PRIORITY INFORMATION

This application claims priority under 35 U.S.C. § 119 to Japanese Patent Application No. 2016-042754, filed in Japan on Mar. 4, 2016, the entire contents of which are incorporated herein by reference.

BACKGROUND

Systems and methods for recognizing human's activities in a space such as an office or a factory where many people are active while sitting or moving are known. If the system can detect whether or not there is a person in a space, the system can be used to judge whether people remain present in the space so as to improve security. Such a system can also be used for monitoring and reducing corporate internal crime and for the management of employee working hours.

For example, Japanese Unexamined Patent Publication No. 2015-132443 describes a sensor that detects heat emitted by a person as a means to detect a person in a certain space. For example, a thermopile sensor can measure the surface temperature of a remote object. By arranging a plurality of thermopile sensors in an array, the plurality of thermopile sensors can measure the temperature of the space for each of the cells partitioned into 4×4, 8×8 or even finer meshes. That is, by using a thermopile sensor, it becomes possible to detect the presence or absence of a person in a space.

SUMMARY

A system in accordance with the present disclosure comprises a sensor and an information processing apparatus. The sensor is installed on a surface so that a detection direction of the sensor is at a non-zero angle from a line normal to the surface. The information process apparatus includes processing circuitry configured to communicate with the sensor; calculate a position of a detection area, in which the sensor detects an object in a predetermined space, according to the non-zero angle and a location of the sensor on the surface; and create correspondence information that associates an area of the predetermined space with the detection area.

The system may further comprise a plurality of sensors, wherein the plurality of sensors includes the sensor, each sensor of the plurality of sensors is installed on the surface, each sensor of the plurality of sensors forms a detection cell to detect the object, the processing circuitry calculates a position of each detection cell according to an angle and location of the corresponding sensor on the surface, and the processing circuitry creates correspondence information that associates each area of the predetermined space with a corresponding detection cell. The processing circuitry may calculate the position of a first detection cell according to an angle of a detection direction of the detection element, corresponding to the first detection cell, with respect to the line normal to the surface. The processing circuitry may calculate a distance from the one of the sensors to a location of the object.

In accordance with the present disclosure, the processing circuitry may associate the area of the predetermined space with a particular detection cell, and when positions of the plurality of detection cells are included in at least one of the areas of the predetermined space, the processing circuitry associates the at least one of the areas of the predetermined space with the plurality of detection cells. The total number of the detection cells differs from a total number of the plurality of sensors.

In accordance with the present disclosure, the processing circuitry is configured to adjust a number of the detection cells. The processing circuitry may be further configured to acquire a detection result from each of the plurality of sensors, determine a presence or absence of the object in each of the detection cells according to each detection result, and generate control data for a device based on the presence or absence of the object for each of the areas. The device may be a lighting device, and when the object is detected in an area within a predetermined distance from the lighting device, processing circuitry generates the control data so that a light amount of the lighting device is set to be larger than when the object is detected in an area outside the predetermined distance from the lighting device.

In accordance with the present disclosure, the sensor is configured to collect heat source data that indicates the presence or absence of the object, and the processing circuitry is configured to determine whether the object is in the detection area according to the heat source data.

In accordance with the present disclosure, an information process apparatus comprises processing circuitry configured to communicate with a sensor that is installed on a surface so that a detection direction of the sensor is at a non-zero angle from a line normal to the surface; calculate a position of a detection area, in which the sensor detects an object in a predetermined space, according to the non-zero angle and a location of the sensor on the surface; and create correspondence information that associates an area of the predetermined space with the detection area.

In accordance with the present disclosure, an information processing method comprises communicating, by processing circuitry of an information processing apparatus, with a sensor that is installed on a surface so that a detection direction of the sensor is at a non-zero angle from a line normal to the surface; calculating, by the processing circuitry, a position of a detection area, in which the sensor detects an object in a predetermined space, according to the non-zero angle and a location of the sensor on the surface; and creating, by the processing circuitry, correspondence information that associates an area of the predetermined space with the detection area.

BRIEF DESCRIPTION OF THE DRAWINGS

FIGS. 4A and 4B are block diagrams illustrating exemplary hardware configurations of a detection apparatus and a first/second control target apparatus;

FIGS. 8A and 8B are diagrams illustrating information stored in a control guideline management database;

FIG. 9 is a diagram illustrating information stored in a control area management database;

FIG. 10A is a diagram illustrating information stored in the area information management database (DB);

FIG. 10B is a diagram illustrating information stored in the /cell/area correspondence DB;

FIGS. 11A and 11B are sequence charts illustrating an exemplary process implemented by the management system;

FIGS. 12A and 12B are example conceptual diagrams of temperature distribution data and heat source data;

FIG. 13 is a diagram illustrating an example of heat source data obtained by synthesizing heat source data transmitted from a plurality of first control target apparatuses having detection apparatuses;

FIG. 22 is a diagram illustrating the first control guideline management table;

DETAILED DESCRIPTION

If the detection range of a thermopile sensor is constructed so that all of a space is covered, then it may necessary to spread out a large number of thermopile sensor arrays throughout the area. For example, when thermopile sensor arrays are installed on a ceiling, it is necessary to spread out many thermopile sensor arrays on the ceiling. In this method, a large number of thermopile sensor arrays are required, which increases construction cost. Also, the maintenance cost is high. If a plurality of thermopile sensor arrays are installed in one installation section on the ceiling, then the construction cost and the maintenance cost can be reduced.

However, in this case, it may be necessary to incline a detection direction of the thermopile sensors in the thermopile sensor array with respect to the ceiling instead of setting the detection direction of each thermopile sensor to be perpendicular/normal to the ceiling. This is because, when the detection direction is directed perpendicular/normal to (downward from) the ceiling, the detection ranges of the adjacent thermopile sensors overlap each other, and as a result, it becomes difficult for the detection range of the thermopile sensor to cover the entire space. If the detection direction of the thermopile sensor array is inclined with respect to the ceiling, however, then the shape of the cell will be curved (i.e. the shape of the cell will not be a square or a rectangle). Because most rooms are not curved (i.e. distorted), it may be difficult to associate detection results with the spaces, and as a result, such a method has a problem in that it becomes difficult to "visualize" people's presence or absence.

Accordingly, the present disclosure is directed to providing a system capable of detecting a target in a predetermined space based on the detection result of a detection unit such as a sensor.

Discussion of such a system is provided with reference to the accompanying drawings.

Figure 1A:
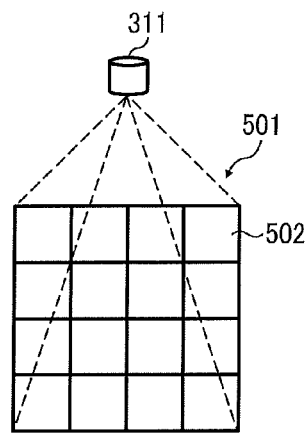
FIGS. 1A-1C are diagrams that illustrate a detection area of temperature distribution sensors.
Figure 1B:
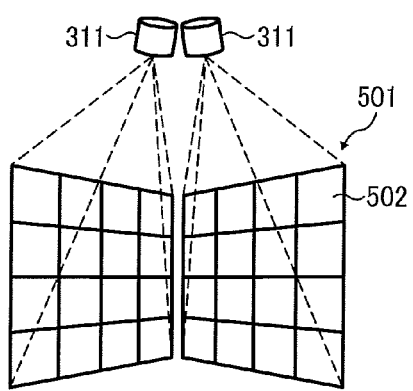
Figure 1C:
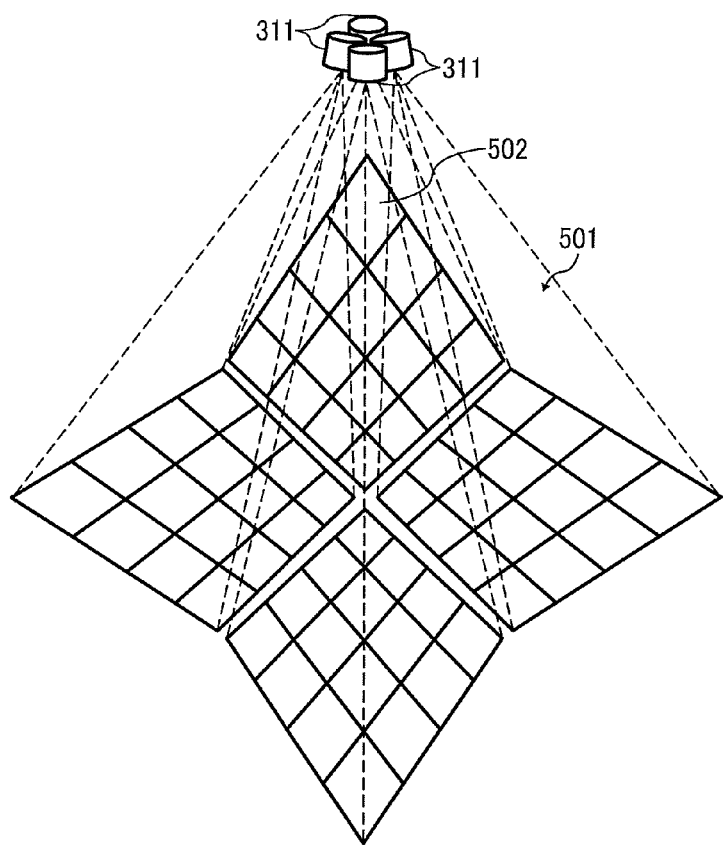

FIGS. 1A-1C are diagrams that illustrate a detection area of temperature distribution sensors. FIG. 1A shows a detection area when one temperature distribution sensor 311 has a 4×4 thermopile sensor. In FIG. 1A, the temperature can be detected only by the 4×4 detection cell 502 just below the temperature distribution sensor 311. The larger the number of the temperature distribution sensors 311, the wider the detection area can be. However, as the installation location of the temperature distribution sensor 311 increases, the cost increases as a result.

Therefore, as shown in FIG. 1B, it is considered to install the two temperature distribution sensors 311 in the same place (the first control target apparatus to be described later). However, in this case, the temperature distribution sensors 311 have to be inclined at an angle relative to the floor surface rather than being installed perpendicular to the floor surface. That is, because a plurality of the temperature distribution sensors 311 have to be installed within a limited area, a temperature detection range 501 of a given temperature distribution sensor 311 cannot be adequately enlarged unless the temperature distribution sensor 11 is installed at an inclined angle.

In FIG. 1A, temperature distribution sensor 311 is installed perpendicular to the floor surface, and as such, the shape of the detection area 501 of the temperature distribution sensor 311 is a square (or a rectangle). In FIG. 1B, two temperature distribution sensors 311 are installed at inclined angles with respect to the floor surface, and as such, the shapes of the detection area 501 of the two temperature distribution sensors 311 are distorted into trapezoidal shapes due to trapezoidal distortion. In this way, the detection area 501 is largely distorted.

As shown in FIG. 1C, it is also possible to install the four temperature distribution sensors 311 in the same place (the first control target apparatus to be described later). However, also in this case, four temperature distribution sensors 311 are installed at inclined angles with respect to the floor surface, and as such, the shapes of the detection ranges 501 of the four temperature distribution sensors 311 are distorted into rhomboidal shapes (diamond shapes) with one diagonal line of a square being extended. This is because the temperature distribution sensor 311 is installed in a state rotated by 90° with respect to the case in FIG. 1B.

The space where a person is present is not distorted with respect to the shape of the detection area 501. Therefore, if the space is divided into a square or a rectangle (rectangle), the system is natural in managing (visualizing) the presence/absence of people in space. Further, it is not easy to divide the space into the shape of the detection area 501 and the detection cell 502.

Therefore, the management system 8 of the present embodiment appropriately associates each detection cell 502 of the detection area 501 with each area of the space partitioned into rectangles. As a result, management of the presence/absence of people in space and control of lighting based on presence/absence are enabled.

Terminology

A predetermined space is a space in which a person can exist. For example, the predetermined space may be a space to be occupied by a plurality of persons, such as a living room.

Specific examples of a room include an office, a factory, a seminar venue, an exhibition space, an indoor stadium, a restaurant, a train, a bus, a ship and the like. However, a room is not limited the examples described above. Also, the home of an individual may be an example of a room as well.

An object to be detected is mainly an organism detected or detected by a detection unit such as a sensor (inanimate object such as a robot may be used). The object may be limited to moving objects. Information related to the position of the detection area is used for calculating or specifying the position of at least a part of the detection cell in which the detection area or the detection area is divided. The position of the detection area is information that can specify the detection area by some index, and includes, for example, coordinates in a predetermined coordinate system. More specifically, the information relating to the position of the detection area indicates the position of a detection unit, an angle of a detection direction of the detection unit, a distance from the detection unit to a place where the object detected by the detection unit is present, and the like.

<Device Control System>

Figure 2:
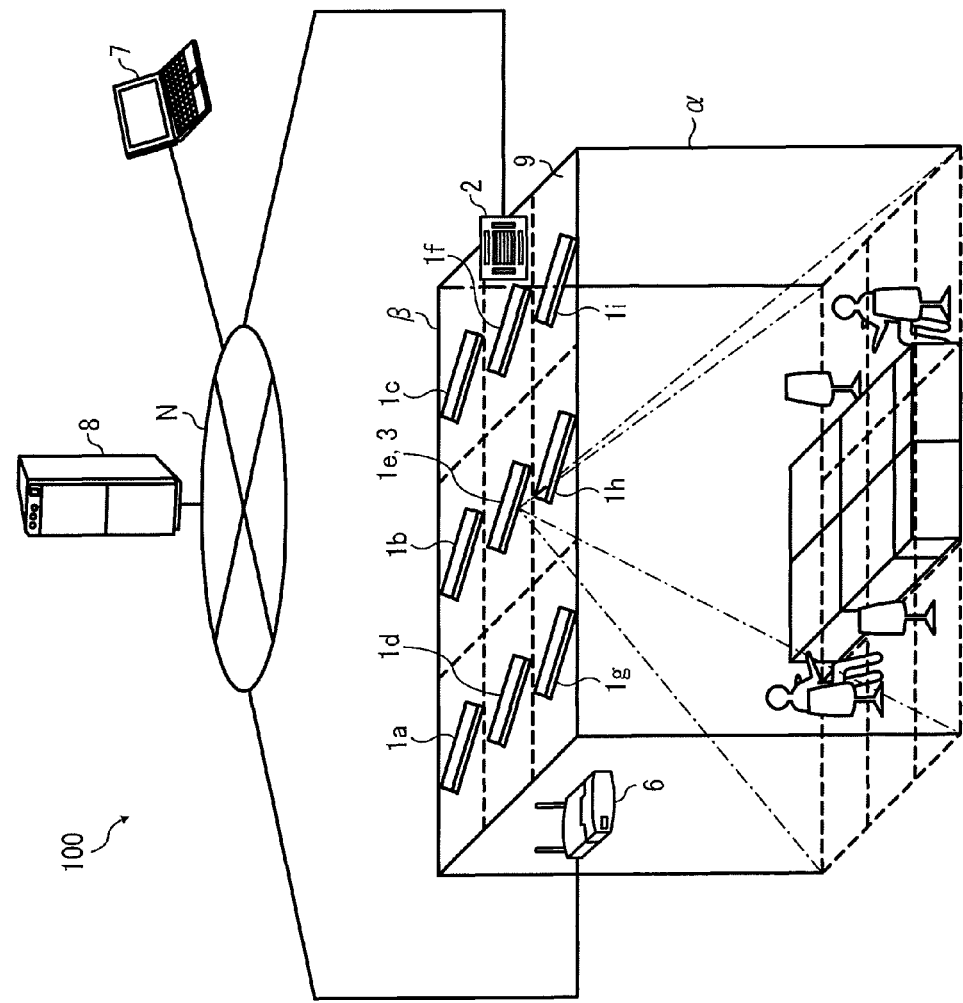
FIG. 2 is a diagram that illustrates an exemplary schematic configuration of a device control system.

FIG. 2 is a diagram illustrating an exemplary schematic configuration of a device control system 100 according to the present disclosure. The device control system 100 includes a plurality of first control target apparatuses 1a, 1b, 1c, 1d, 1e, 1f, 1g, 1h, and 1i installed on a ceiling β of a room α corresponding to an example of a predetermined space, a second control target apparatus 2, a wireless router 6, an administrator PC 7 (Personal Computer) and a management system 8 that are capable of communicating with each other via a communication network N. Note that in the following descriptions, an arbitrary first control target apparatus among the plurality of first control target apparatuses 1a, 1b, 1c, 1d, 1e, 1f, 1g, 1h, and 1i may generically be referred to as "first control target apparatus 1".

In FIG. 2, the ceiling β is divided into nine areas 9, and the first control target apparatus 1 is installed in each of the areas 9. A detection apparatus 3 is provided in the first control target apparatus 1e arranged at the center of the ceiling β. The size of each area 9 may be 50 square centimeters ($cm^2$) to several square meters ($m^2$), for example. However, the size of the area 9 is not particularly limited and may be suitably set up according to the size and performance of the first control target apparatus 1, for example. Also, the areas 9 into which the ceiling β are divided do not necessarily have to be the same size and the areas 9 do not necessarily have to be squares. For example, the areas 9 may be arranged into other polygons such as hexagons in which case the distances between the first control target apparatuses 1 may be equal as in the case of arranging the areas 9 into squares.

The second control target apparatus 2 is installed at suitable intervals on the ceiling β. Note the although only one second control target apparatus 2 is illustrated in FIG. 2, a plurality of second control target apparatuses 2 may be installed in one room α as described below. Also, note that although the second control target apparatuses 2 are preferably installed at equal intervals, they do not necessarily have to be installed at equal intervals. The number of first control target apparatuses 1 and the number of second control target apparatuses 2 that are installed in the room α may vary owing to the different ranges that can be covered by the first control target apparatus 1 and the second control target apparatus 2, the difference in size of the first control target apparatus 1 and the second control target apparatus 2, and the difference in cost of the first control target apparatus 1 and the second control target apparatus 2, for example. The number of first control target apparatuses 1 and the number of second control target apparatuses 2 may be arbitrarily determined. Note that in the case where a plurality of second control target apparatuses 2 are provided, the second control target apparatuses 2 may be individually referred to as second control target apparatus 2a, 2b and 2c, for example, and generically referred to as "second control target apparatus 2".

The first control target apparatus 1 is an LED (Light Emitting Diode) lighting apparatus. The detection apparatus 3 included in the first control target apparatus 1e detects a temperature distribution within the room α that is divided into a plurality of areas 9 (e.g., nine areas 9 in FIG. 1) using a thermopile sensor, for example, and transmits heat source data indicating the presence or absence of a heat source to the management system 8. Note that a wireless LAN may be used to transmit the heat source data, for example. However, the heat source data may also be transmitted by wire, for example. The floor of the room α is where a person as an example of a heat source corresponding to a detection target may be present.

The second control target apparatus 2 is an air conditioning apparatus (an indoor unit of the second control target apparatus 2 is illustrated in FIG. 2). The outdoor unit of the second control target apparatus 2 may be installed in a predetermined location, which may be individually provided for each second control target apparatus 2 or commonly provided for a plurality of second control target apparatuses 2. In FIG. 2, the second control target apparatus 2 and the management system 8 are connected by wire, but the second control target apparatus 2 and the management system 8 may communicate wirelessly, for example.

The wireless router 6 receives the heat source data transmitted from the detection apparatus 3 and transmits the heat source data to the management system 8 via the communication network N. The communication network N may be configured by a LAN (Local Area Network) and may also include the Internet, for example.

As will be further described below, the management system 8 has functions of an information processing apparatus and may be referred to as a server. Based on the heat source data transmitted from the wireless router 6, the management system 8 generates control data for controlling the first control target apparatus 1 and the second control target apparatus 2, and transmits the generated control data to the first control target apparatus 1 and the second control target apparatus 2. The first control target apparatus 1 performs LED lighting control based on the control data. The second control object apparatus 2 controls the temperature, humidity, wind power, and wind direction, for example, based on the control data. In this way, the management system 8 can control both lighting and air conditioning to thereby provide a space that is comfortable for occupants in the room while achieving energy conservation.

As can be appreciated from the above description, the first control target apparatus 1e having the detection apparatus 3 installed therein not only detects the temperature distribution within the room α but also performs LED lighting control of a lighting apparatus installed therein. That is, the first control target apparatus 1e includes the detection apparatus 3 but also includes the same functions and features of the other first control target apparatuses 1.

Also, the detection apparatus 3 may be installed inside or near the second control target apparatus 2. Further, the detection apparatus 3 may be installed separately from the first control target apparatus 1 or the second control target apparatus 2. However, by integrating the detection apparatus 3 with the first control target apparatus 1e, the detection apparatus 3 may be easily installed/removed, and a space for installing the detection apparatus 3 may not be necessary.

The administrator PC 7 is a PC operated by the administrator of the device control system 100. The administrator PC 7 makes various settings by communicating with the management system 8 and displays detection data for each area. The administrator may be called as a setter or a user of the device control system 100.

<First Control Target Apparatus>

Figure 3:
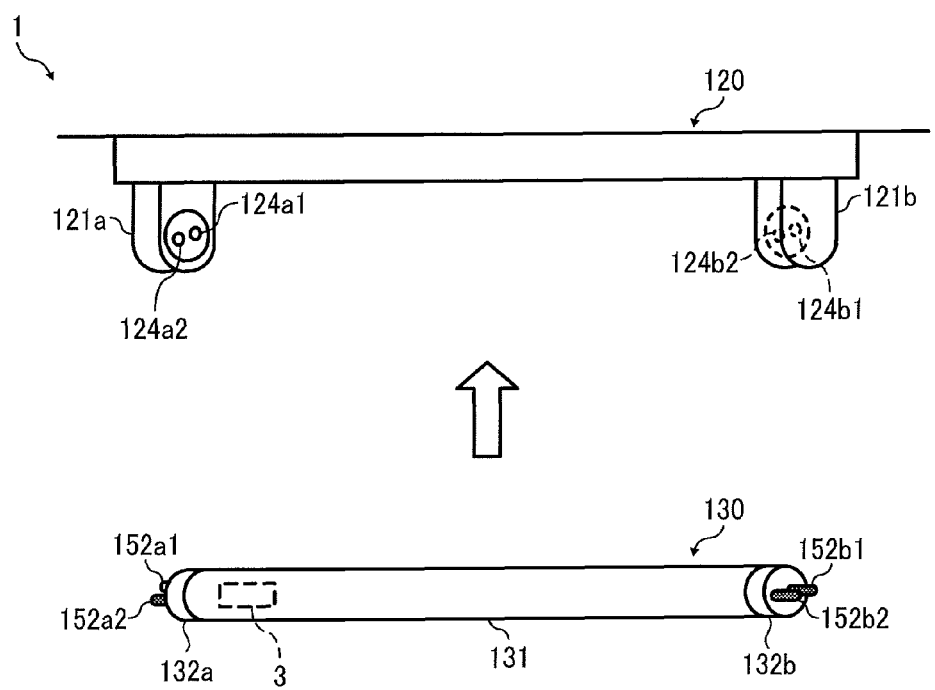
FIG. 3 illustrates an example external perspective view of an LED lighting apparatus as an example of a first control target apparatus.

In the following, the first control target apparatus 1 is described with reference to FIG. 3. FIG. 3 is an example external perspective view of an LED lighting apparatus as an example of the first control target apparatus.

In FIG. 3, the first control target apparatus 1 as an LED lighting apparatus includes a main unit 120 and a straight tube-type LED lamp 130 to be attached to the main unit 120. The main unit 120 may be installed around the center of a corresponding area 9 of the ceiling β of the room α, for example. A socket 121a and a socket 121b are respectively provided at the end portions of the main unit 120. The socket 121a includes power supply terminals 124a1 and 124a2 for supplying power to the LED lamp 130.

The socket 121b also includes power supply terminals 124b1 and 124b2 for supplying power to the LED lamp 130. In this way the main unit 120 can supply power from a power source to the LED lamp 130.

The LED lamp 130 includes a translucent cover 131 and bases 132a and 132b respectively provided at the end portions of the translucent cover 131. Note that the first control target apparatus 1e may have the detection apparatus 3 arranged adjacent to the translucent cover 131 or inside the translucent cover 131, for example. The translucent cover 131 may be made of a resin material such as acrylic resin, for example, and is arranged to cover an internal light source.

Further, the base 132a includes terminal pins 152a1 and 152a2 that are respectively connected to the power supply terminals 124a1 and 124a2 of the socket 121a. The base 132b includes terminal pins 152b1 and 152b2 that are respectively connected to the power supply terminals 124b1 and 124b2 of the socket 121b. By attaching the LED lamp 130 to the main unit 120, electric power may be supplied to the LED lamp 130 from the respective terminal pins 152a1, 152a2, 152b1, and 152b2 via the respective power supply terminals 124a1, 124a2, 124b1, and 124b2 of the main unit 120, for example. As a result, the LED lamp 130 may irradiate light to the exterior through the translucent cover 131. Also, the detection apparatus 3 may be run by the electric power supplied from the main unit 120.

<Hardware Configuration of Detection Apparatus, First Control Target Apparatus, and Second Control Target Apparatus>

In the following, the hardware configuration of the detection apparatus 3 will be described with reference to FIG. 4A. FIG. 4A is a block diagram illustrating an example hardware configuration of the detection apparatus 3. The detection apparatus 3 includes a wireless module 301, an antenna I/F (interface) 302, an antenna 302a, a sensor driver 304, a temperature distribution sensor 311, an illuminance sensor 312, a temperature and humidity sensor 313, an apparatus controller 315, and a bus line 310, such as an address bus and/or a data bus, for electrically connecting the above hardware elements.

In an exemplary implementation, detection apparatus 3 includes general or specific-purpose processor, CPU, a digital signal processor (DSP), an ASIC, a field programmable gate array (FPGA) or other programmable logic device (PLD), a discrete gate or transistor logic, discrete hardware components or any other combination for executing functions to realize logic blocks. Detection apparatus 3 may include modules, elements and/or circuits, all of which can be referred to as processing circuitry. The processing circuitry may include a general-purpose processor, and the processing circuitry may include any number of processors, controllers, micro-controllers or state machines. The processing circuitry can also be a combination of computer equipment, sensors, devices and the processing circuitry may be separately or jointly configured to implement the functionality of wireless module 301, antenna I/F 302, antenna 302a, sensor driver 304, temperature distribution sensor 311, illuminance sensor 312, temperature and humidity sensor 313, apparatus controller 315, and bus line 310, to be discussed as follows.

The wireless module 301 establishes wireless communication with an external device via the antenna I/F 302 and the antenna 302a. The wireless module 301 may be configured to establish communication based on a communication system, such as Bluetooth (registered trademark), WiFi, or ZigBee, for example. Note that wired communication using an Ethernet (registered trademark) cable or PLC (Power Line Communications) may be used instead of wireless communication, for example. The wireless module 301 operates under control of a communication control program executed by the apparatus controller 315.

The temperature distribution sensor 311 is a thermal detection element that detects the temperature distribution within the room α by detecting infrared rays. By using such a thermal detection element, the surface temperature of a person or an object can be detected, and in this way, the temperature of an area where a person is present may be detected. The thermal detection element includes an absorption layer that absorbs and converts light into heat and is configured to output a temperature change of the absorption layer as an electric signal. Specific examples of thermal detection elements include thermopiles, bolometers, pyroelectric elements, diodes with voltage-current characteristics that change, and the like. It is assumed that the temperature distribution sensor 311 detects the temperature distribution using a thermopile. The temperature distribution sensor 311 includes a plurality of thermopile sensors and is configured to detect the temperature of each detection cell as described below.

The illuminance sensor 312 is a sensor that detects the illuminance of the room α. The temperature detected by the temperature and humidity sensor 313 is used for conversion from the temperature and humidity of the ceiling surface to the water vapor amount. The humidity on the floor surface is calculated from the water vapor amount and the temperature of the floor surface by the thermopile.

The sensor driver 304 is an interface (e.g. hardware circuit) for the temperature distribution sensor 311, the illuminance sensor 312, and the temperature and humidity sensor 313. The sensor driver 304 converts commands for driving the temperature distribution sensor 311, the illuminance sensor 312, and the temperature and humidity sensor 313 that are transmitted from the apparatus controller 315 into commands compatible with the respective sensors, and transmits the converted commands to the respective sensors. Also, the sensor driver 304 converts signals output by the above sensors into signals in a format compatible with the apparatus controller 315, and transmits the converted signals to the apparatus controller 315.

The apparatus controller 315 is a controller for controlling the entire detection apparatus 3. As discussed above, apparatus controller 315 may be an information processing apparatus, and apparatus controller 315 encompass or include elements such as a microcomputer, CPU, ROM, and RAM, for example. The apparatus controller 315 may be configured by hardware such as an IC (integrated chip) or processing circuitry. For example, the apparatus controller 315 may control the timings at which the temperature distribution sensor 311, the illuminance sensor 312, and the temperature and humidity sensor 313 detect the temperature distribution, the illuminance, and the temperature and humidity, for example, and process data output by these sensors. For example, the apparatus controller 315 may generate heat source data indicating the presence or absence of a heat source based on temperature distribution data output by the temperature distribution sensor 311. The apparatus controller 315 may then transmit detection data including the generated heat source data to the management system 8.

Moreover, functionality of the processing circuitry of detection apparatus 3 may be stored in a non-transitory computer-readable medium as one or more commands executed by the processing circuitry. The recording medium can be any real medium that can be accessible by the processing circuitry. Such a non-transitory computer-readable medium may include a RAM, a ROM, an EEPROM, or other static/dynamic memory or media.

FIG. 4B illustrates an example hardware configuration of the first control target apparatus 1 or the second control target apparatus 2. The apparatus controller 315 of the first control target apparatus 1 controls LED lighting based on control data transmitted from the management system 8, for example. The apparatus controller 315 of the second control target apparatus 2 controls air conditioning based on control data transmitted from the management system 8, for example.

In exemplary implementations, one or both of first control target apparatus 1 and second control target apparatus 2 may include general or specific-purpose processor, CPU, a digital signal processor (DSP), an ASIC, a field programmable gate array (FPGA) or other programmable logic device (PLD), a discrete gate or transistor logic, discrete hardware components or any other combination for executing functions to realize logic blocks. First control target apparatus 1 and second control target apparatus 2 may include modules, elements and/or circuits, all of which can be referred to as processing circuitry. The processing circuitry may include a general-purpose processor, and the processing circuitry may include any number of processors, controllers, micro-controllers or state machines. The processing circuitry can also be a combination of computer equipment, sensors, devices and the processing circuitry may be separately or jointly configured to implement the functionality of wireless module 301, antenna I/F 302, antenna 302a, apparatus controller 315, bus line 310 and control target device 319.

Note that the apparatus controller 315, the antenna I/F 302 and the wireless module 301 of the first control target apparatus 1 or the second control target apparatus 2 may be substantially identical to those of the detection apparatus 3 as described above with reference to FIG. 4A. The first control target apparatus 1 or the second control target apparatus 2 includes the control target device 319. The control target device 319 of the first control target apparatus 1 may include the LED lamp 130 and/or a control circuit of the LED lamp 130, for example. The control target device 319 of the second control target apparatus 2 may include a heat pump, a compressor, and/or a control circuit of an air conditioner, for example.

Note that in the first control target apparatus 1e including the detection apparatus 3, the apparatus controller 315, the antenna I/F 302, and the wireless module 301 may be commonly used to implement functions relating to the detection apparatus 3 and functions relating to lighting control of the first control target apparatus 1e, for example. In this way, the number of components of the detection apparatus 3 may be reduced, for example.

<Hardware Configuration of Management System 8>

Figure 5:
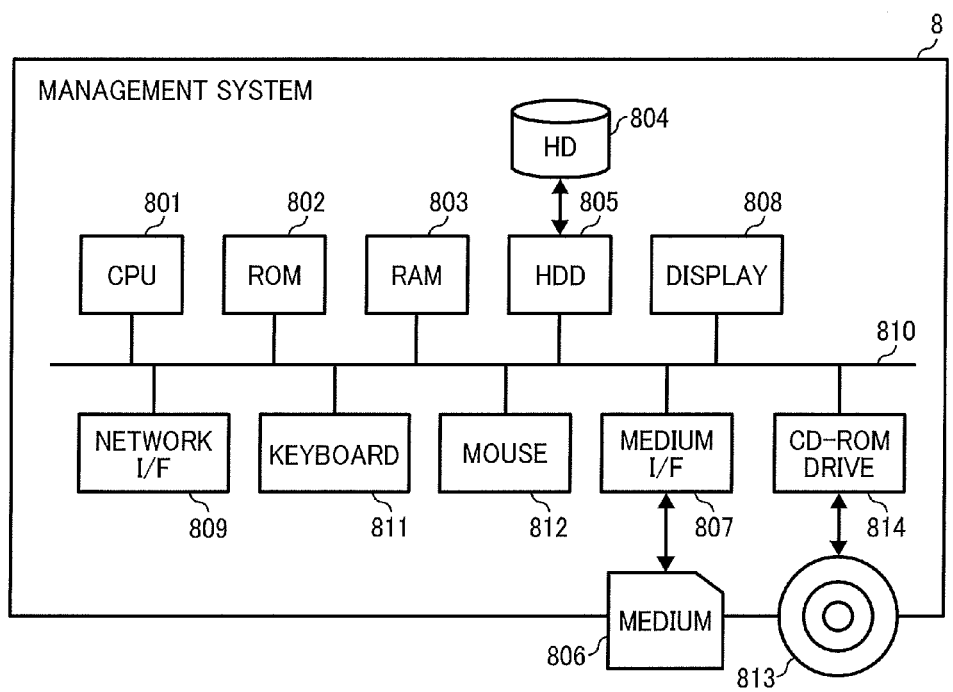
FIG. 5 is a block diagram illustrating an example hardware configuration of a management system.

In the following, the hardware configuration of the management system 8 is described. FIG. 5 illustrates an example hardware configuration of the management system 8.

The management system 8 may be implemented by an information processing apparatus, for example. The management system 8 includes processing circuitry. In some embodiments, the processing circuitry includes a CPU 801 that controls the overall operations of the management system 8, a ROM 802 that stores programs used for driving the CPU 801 such as an IPL (Initial Program Loader), and a RAM 803 that is used as a work area of the CPU 801. The management system 8 also includes an HD (Hard Disk) 804 that stores various data and programs such as a management program and an HDD (Hard Disk Drive) 805 that controls reading/writing of various data from/to the HD 804 under control of the CPU 801. The management system 8 also includes a medium I/F (interface) 807 for controlling reading/writing (storage) of data from/to a medium 806 such as a flash memory; a display 808 for displaying various types of information, such as a cursor, a menu, a window, characters, images, and the like; and a network I/F 809 for establishing data communication using the communication network N. The management system 8 further includes a keyboard 811 including a plurality of keys for inputting characters, numeric values, and various instructions; a mouse 812 for selecting and executing various instructions, selecting an object to be processed, moving a cursor, and the like; a CD-ROM drive 814 for controlling reading/writing of various data from/to a CD-ROM (Compact Disc Read Only Memory) 813 as an example of a removable recording medium; and a bus line 810, such as an address bus or a data bus, for electrically connecting the above hardware elements. In some implementations, the processing circuitry of management system 8 may be separately or jointly configured to implement the functionality of CPU 801, ROM 802, RAM 803, HD 804, HDD 805, medium 806, medium I/F 807 and network I/F 809, to be discussed as follows.

Note that the hardware elements of the management system 8 illustrated in FIG. 5 do not necessarily have to be provided within one housing or provided as a unitary device. That is, FIG. 5 merely indicates hardware elements that are preferably included in the management system 8 and the hardware elements in FIG. 5 may be referred to as processing circuitry. Also, certain functions of the management system 8 may be allocated to cloud computing, for example, such that the physical configuration of the management system 8 need not be fixed but may be dynamically changed by connecting/disconnecting hardware resources according to the processing load, for example.

Also, note that the management program to be executed by the management system 8 may be stored in a storage medium, such as the medium 806 or the CD-ROM 813, in an executable format or a compressed format and distributed in such a state, for example. The management program may also be distributed by a program distributing server, for example.

The hardware configuration of the administrator PC 7 is the same as that of the management system 8.

<Functional Configuration of Device Control System>

Figure 6:
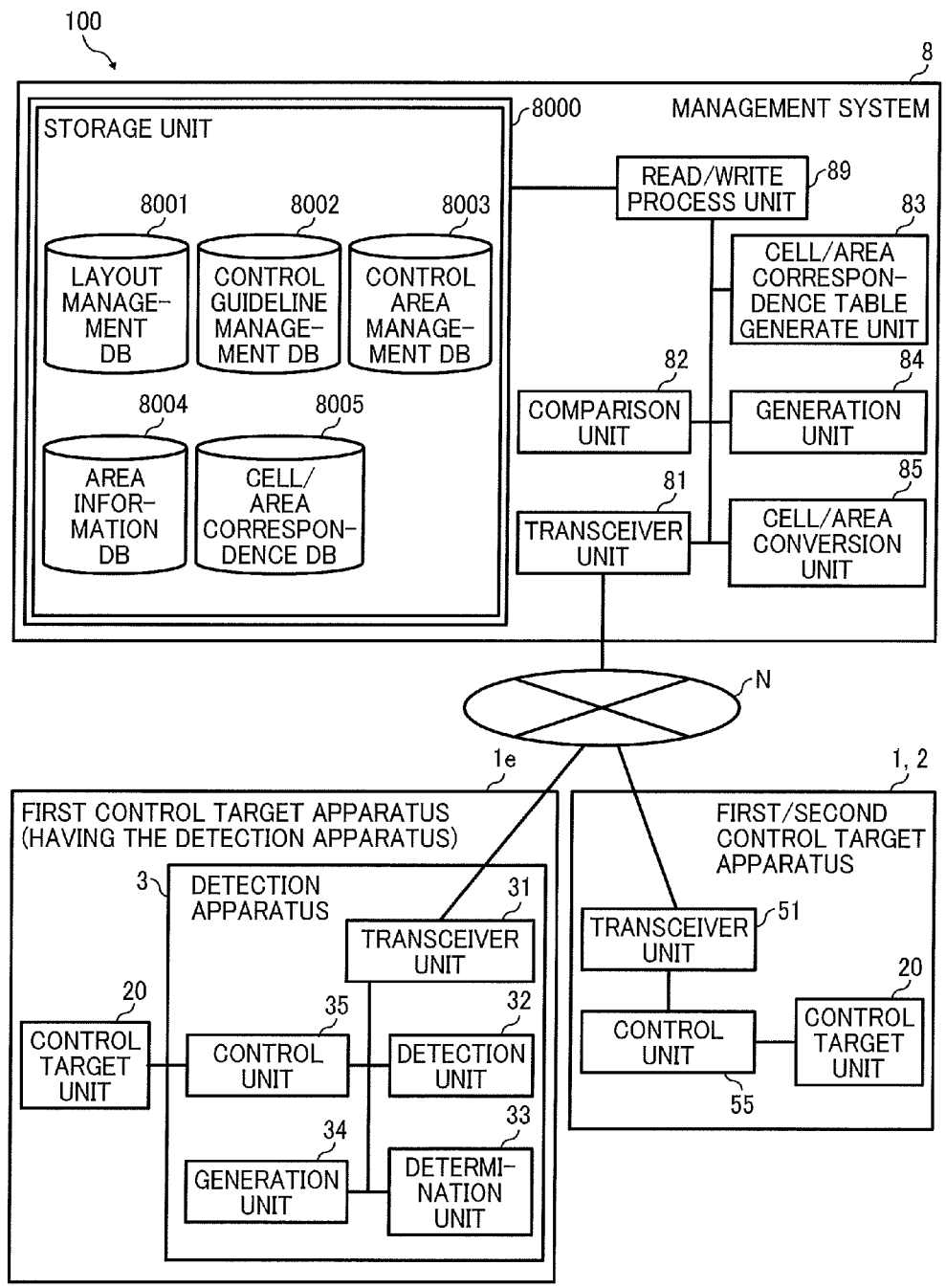
FIG. 6 is a diagram illustrating an exemplary functional configuration of the device control system.

In the following, an example functional configuration of the device control system 100 is described with reference to FIG. 6. FIG. 6 is a block diagram illustrating example functional configurations of the first control target apparatus 1e including the detection apparatus 3, the first control target apparatus 1 without the detection apparatus 3, the second control target apparatus 2, and the management system 8 of the device control system 100.

<Functional Configuration of First Control Target Apparatus 1e>

The first control target apparatus 1e includes a control target unit 20 and functions of the detection apparatus 3. The detection apparatus 3 includes a transceiver unit 31, a detection unit 32, a determination unit 33, a generation unit 34, and a control unit 35. These functional units may be implemented by operations of the processing circuitry, such as apparatus controller 315 illustrated in FIG. 4A. The control target unit 20 may be implemented by the LED lamp 130 that is subject to lighting control, for example.

The transceiver unit 31 of the detection apparatus 3 may be implemented by the apparatus controller 315 and the wireless module 301 of FIG. 3A. For example, the transceiver unit 31 may exchange various types of data with the management system 8 via the communication network N.

The detection unit 32 may be implemented by operations of the temperature distribution sensor 311, the illuminance sensor 312, and the temperature and humidity sensor 313, for example. The detection unit 32 detects the temperature distribution, the illuminance, the temperature and humidity of each area 9 within a predetermined space.

The determination unit 33 may be implemented by operations of the apparatus controller 315. For example, the determination unit 33 may determine whether the temperature of the area 9 is within a predetermined range (e.g., 30° C. to 35° C.).

The generation unit 34 may be implemented by operations of the apparatus controller 315. For example, the generation unit 34 may generate heat source data indicating the presence or absence of a heat source based on a determination result of the determination unit 33.

The control unit 35 may be implemented by operations of the apparatus controller 315. For example, the control unit 35 may generate a control signal to be output to the control target unit 20 based on control data transmitted from the management system 8.

<Functional Configuration of First Control Target Apparatus 1 without Detection Apparatus/Second Control Target Apparatus 2>

In the following, functional configurations of the first control target apparatus 1 not having the detection apparatus 3 and the second control target apparatus 2 are described.

The first control target apparatus 1 without the detection apparatus 3 and the second control target apparatus 2 include a transceiver unit 51, a control unit 55, and a control target unit 20. The transceiver unit 51 may be implemented by operations of the apparatus controller 315 and the wireless module 301, for example. The transceiver unit 51 exchanges various types of data with the management system 8 via the communication network N.

The control unit 55 may be implemented by operations of the apparatus controller 315, for example. The control unit 55 may generate a control signal to be output to the control target unit 20 based on control data transmitted from the management system 8, for example.

In some implementations, the processing circuitry of first control target apparatus 1 corresponds to control unit 55. That is, the processing circuitry executes the functions and processes of control unit 55 so as to control first control target apparatus 1.

The control target unit 20 of the first control target apparatus 1 may be implemented by the LED lamp 130 that is subject to lighting control, for example. The control target unit 20 of the second control target apparatus 2 may be implemented by a heat pump and a compressor of an air conditioner, for example.

<Functional Configuration of Management System 8>

In the following, the functional configuration of the management system 8 is described. The management system 8 includes a transceiver unit 81, a comparison unit 82, a generation unit 84, a cell/area correspondence table generation unit 83, a cell/area conversion unit 85, and a read/write process unit 89. The above functional units may be implemented by the processing circuitry, for example, by operations prompted by commands from the CPU 801 based on a management program loaded from the HD 804 into the RAM 803 of FIG. 5, for example. Further, the management system 8 includes a storage unit 8000 that may be implemented by the RAM 803 and the HD 804 of FIG. 5, for example. The storage unit 8000 includes a layout management database (DB) 8001, a control guideline management DB 8002, a control area management DB 8003, an area information DB 8004, and a cell/area correspondence DB 8005. In the following, the above databases described.

(Layout Management DB)

Figures 7A, 7B:
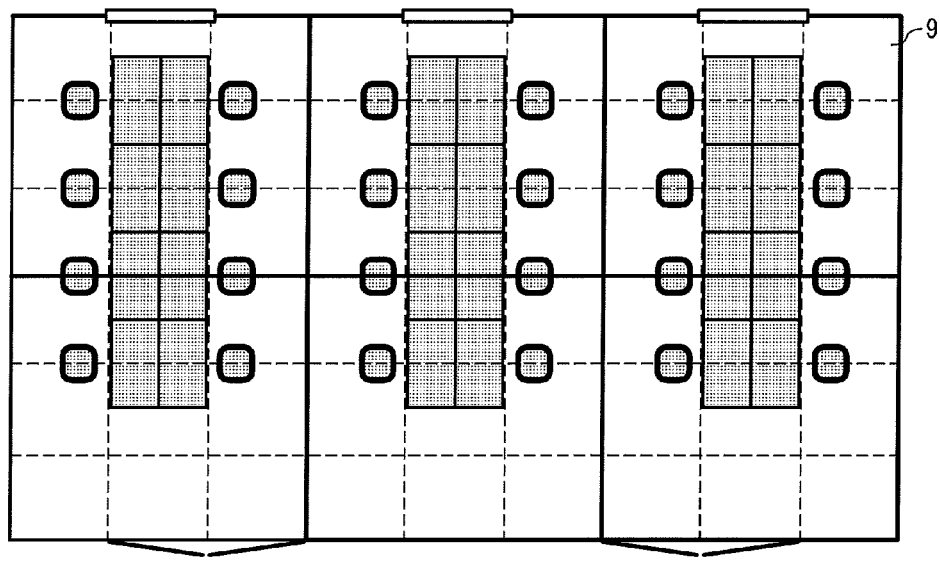
FIGS. 7A and 7B are diagrams illustrating information stored in a layout management database.

In the following, the layout management DB 8001 is described with reference to FIG. 7A. The layout management DB 8001 manages layout information of the first control target apparatus 1 and the second control target apparatus 2. FIG. 7A illustrates an example of layout information of the first control target apparatus 1 and the second control target apparatus 2.

In the example layout information illustrated in FIG. 7A, the room α is divided into 54 areas 9, and an apparatus ID identifying an LED lighting apparatus as an example of the first control target apparatus 1 is associated with each area 9. Note that in FIG. 7A, the apparatus ID is represented by a combination of an alphabet (a, b, c, d, e, or f) and a two-digit number that is indicated in each area 9. Among these apparatus IDs, the nine areas 9 on the upper left side of FIG. 7A having apparatus IDs starting with the alphabet "a" correspond to the nine areas 9 illustrated in FIG. 2. That is, FIG. 2 illustrates a part of the room α. The entire room α actually includes six blocks having apparatus IDs starting with a, b, c, d, e, and f. Each block is divided into nine areas 9 such that the entire room α includes a total of 54 areas 9. Note that the division of the room α into areas 9 as described above is merely one example, and a given space may be divided into any number of blocks, and a block may be divided into any number of areas, for example.

In the example layout information of FIG. 7A, a combination of the alphabet "x" and a two-digit number represents an apparatus ID identifying the second control target apparatus 2. Note that the second control target apparatus 2 illustrated next to the first control target apparatus 1*f* in FIG. 2 corresponds to the second control target apparatus 2 with the apparatus ID "x11" indicated in FIG. 7A. Although the second control target apparatuses 2 with the apparatus IDs "x12", "x21", "x22" are not illustrated in FIG. 1, they are installed on the ceiling β at the corresponding areas 9 of the room α as indicated in FIG. 7A. That is, in the present example, four air conditioners are installed on the ceiling β of the room α.

Note that an ID may be a name, a symbol, a character string, a numerical value, or a combination thereof used for uniquely distinguishing a specific object from a plurality of objects. The ID may also be called identification information or an identifier. Specific examples of an ID include but are not limited to a combination of serial numbers that do not overlap with a room number, a simple serial number, an apparatus serial number, and the like.

One first control target apparatus 1 is installed in each area 9, and as such, the apparatus ID of the first control target apparatus 1 is used as identification information for identifying the area 9.

FIG. 7B is a conceptual diagram of the layout information of the room α. FIG. 7B illustrates an example actual layout of the room α that is divided into areas 9 corresponding to the areas 9 of the layout information of FIG. 7A. The layout of FIG. 7B is divided into areas 9 by dashed lines and solid lines. FIG. 7B illustrates an actual layout in which desks and chairs are arranged. The layout of FIG. 7B is similarly divided into 54 areas 9 as in the layout information of the room α illustrated in FIG. 7A. That is, the positions of the areas 9 illustrated in FIG. 7B correspond to the positions of the areas 9 illustrated in FIG. 7A. In FIG. 7B, the lower side corresponds to a side toward a hallway Y, and the upper side corresponds to a side toward the window.

(Control Guideline Management DB)

In the following, the control guideline management DB 8002 is described with reference to FIGS. 8A and 8B. The control guideline management DB 8002 manages a first control guideline management table as illustrated in FIG. 8A, for example. The first control guideline management table associates each heat source data field with corresponding control to be implemented with respect to the control target unit 20. For example, if the heat source data is "1", this indicates that a heat source is present and that a person is present in the corresponding area 9. In this case, according to the first control guideline management table, the light output is to be controlled to 100% so as to maximize the amount of light output by the LED lamp 130 (control target unit 20) to thereby enable a person to work comfortably. On the other hand, if the heat source data is "0", this indicates that there is no heat source and no one is present in the corresponding area 9. In this case, the light output of the LED lamp 130 (control target unit 20) is to be adjusted to 60% in order to promote energy conservation. Note that 100% is merely one example of a suitable amount of light to be output by the control target unit 20 for promoting comfort, and 60% is one example of a suitable amount of light to be output by the control target unit 20 for promoting energy conservation without making work difficult. In other examples, when the heat source data is "1", the amount of light may be set to 90%, and when the heat source data is "0", the amount of light may be set to 50%. That is, the amount of light may be set to any suitable amount as long as the amount of light to be output when the heat source data is "1" is higher than the amount of light to be output when the heat source data is "0".

Also, the control guideline management table may be set up with respect to each first control target apparatus 1 or each area 9, for example. This example is described later. In this way, the management system 8 may be able to control the first control target apparatuses 1 based on different control guidelines depending on the location of the first control target apparatuses 1, for example.

The control guideline management DB 8002 also manages a second control guideline management table as illustrated in FIG. 8B, for example. The second control guideline management table associates each population density range and each set of temperature gap+humidity with a corresponding control guideline for controlling air conditioning. Note that the temperature gap refers to the difference between the target temperature for the second control target apparatus 2 in controlling the temperature and the actual temperature detected by the temperature distribution sensor 311. According to the second control guideline management table of FIG. 8B, for example, when the population density is 1% to 19%, the temperature gap is in the range from −T1° C. to −T2° C. with respect to the target temperature, and the humidity is less than H1%, the second control target apparatus 2 is controlled to increase the temperature by +2° C. with respect to the target temperature. When the humidity is greater than or equal to H1% with the same temperature gap (−T1° C. to −T2° C.) and the same population density (1% to 19%), the second control target apparatus 2 is controlled to operate in dry mode.

As illustrated in FIG. 8B, a control guideline for controlling air conditioning may be set up with respect to each combination of temperature gap and humidity and with respect to each population density range. In this way, the management system 8 may be able to perform fine and detailed air conditioning control. For example, if the population density of an area 9 is relatively high, the temperature of the area 9 may increase due to the body heat of persons present in the area 9. Thus, the management system 8 may anticipate such a temperature increase and control the second control target apparatus 2 before any discomfort is felt by the persons present in the area 9, for example. That is, the management system 8 may implement feedforward control. In this way, comfort may be further improved.

Note that the manner in which the population density ranges are divided is merely one example, and the population density may be subdivided into finer ranges, or the population density ranges may be divided into unequal ranges, for example. Also, note that the manner in which the population density is calculated according to how many areas in the control range of the second control target apparatus 2.

(Control Area Management DB)

In the following, the control area management DB 8003 is described with reference to FIG. 9. The control area management DB 8003 manages a control area management table as illustrated in FIG. 9, for example. The control area management table manages the apparatus ID of each second control target apparatus 2 in association with corresponding area IDs. The area ID corresponds to the apparatus ID of the first control target apparatus 1. As can be appreciated from FIG. 7A, the apparatus ID of each second control target apparatus 2 is associated with the area IDs of a 3×3 block of areas 9 centered around the second control target apparatus 2 in the control area management table.

Note that the 3×3 block of areas 9 associated with the apparatus ID of each second control target apparatus 2 is merely one example, and in other examples, a 4×4 block of areas 9 or the like may be associated with the apparatus ID of each second control target apparatus 2, for example. Also, each area 9 may be associated with the second control target apparatus 2 that is closest thereto, for example. Note that one first control target apparatus 1 is associated with one area 9, and as such, a control area management table associating each first control target apparatus 1 with a corresponding area 9 is not necessary. However, in a case where a first control target apparatus 1 is used to detect the presence/absence of a heat source at an area 9 other than the area 9 directly below this first control target apparatus 1, a control area management table similar to that illustrated in FIG. 9 may be set up for the first control target apparatus 1, for example.

(Area Information DB)

Next, the area information DB 8004 is described with reference to FIG. 10A. In the area information DB 8004, an area information table as shown in FIG. 10A is managed. In the area information table, the coordinate information of each area 9 is registered in the area ID of the area 9. The coordinate information of each area 9 is, for example, the coordinates of the diagonal vertex. As a result, the management system 8 can determine from where to where each area is. For example, an area 9 with area ID=a11 is a square with 0 to 100 cm in the X direction and 0 to 100 cm in the Y direction. The size of the area is an example.

/(Cell/Area Correspondence DB)

Next, with reference to FIG. 10B, a mass/area correspondence DB is described. In the mass/area correspondence DB, a mass/area correspondence table as shown in FIG. 10B is managed. The mass/area correspondence table is a table for associating the detected cell 502 with the area 9. For this reason, the area ID is registered in the cell/area correspondence table in association with the cell ID. The cell ID is an ID for identifying the detection cell 502. For example, a non-overlapping number, a combination of the device ID of the first control target device 1, numerals, and alphabets. One cell ID corresponds to only one area ID. However, one area ID may correspond to a plurality of cell IDs in some cases.

(Functional Units of Management System)

Referring back to FIG. 6, the functional units performed by the processing circuitry of the management system 8 will now be described. The transceiver unit 81 receives detection data from the detection apparatus 3, gets detection data from the detection apparatus 3 and transmits control data to the detection apparatus 3, for example.

The cell/region correspondence table generation unit 83 generates a cell/region correspondence table that associates the detection cell 502 with the area 9. The created cell/region correspondence table is stored in the cell/region correspondence DB 8005.

The cell/region converting unit 85 converts the heat source data created based on the detection cell 502 into heat source data (the presence/absence of a person) for each area 9 with reference to the cell/region correspondence table.

The comparison unit 82 compares the layout information as illustrated in FIG. 7A with heat source data as illustrated in FIG. 13 (described below), for example. In this way, the presence/absence of a person in each area 9 is determined.

The generation unit 84 refers to the comparison result of the comparison unit 82 and the first control guideline management table to generate control data indicating the light output (amount of light) for the first control target apparatus 1. Further, the generation unit 84 refers to the comparison result of the comparison unit 82 and the second control guideline management table to generate air conditioning control data for the second control target apparatus 2 based on heat source data and humidity data detected by the temperature and humidity sensor 313, for example.

The cell conversion process unit 85 converts the heat source data transmitted from the temperature distribution sensor 311 into heat source data for an area 9 of the room α. Note that the conversion process is described is described in detail below.

The read/write process unit 89 reads data from the storage unit 8000 or stores data in the storage unit 8000, for example.

<Operation Procedure>

In the following, processes or operations of the management system 8 are described with reference to FIGS. 11-13. FIGS. 11A and 11B are sequence charts illustrating an example process implemented by the management system 8. FIG. 12A is a conceptual diagram of a temperature distribution detected by the temperature distribution sensor 311. FIG. 12B is a conceptual diagram of heat source data indicating the presence/absence of a heat source. FIG. 13 is a conceptual diagram of heat source data indicating the presence/absence of a heat source in all the areas 9 of the room α.

In the present example process, the management system 8 generates control data for controlling the first control target apparatus 1 and the second control target apparatus 2 based on various data detected by the first control target apparatus 1*e* and transmits the generated control data to the first control target apparatus 1 and the second control target apparatus 2 to cause the first control target apparatus 1 and the second control target apparatus 2 to perform lighting control and air conditioning control. In the following, in order to simplify the description, processes implemented by the first control target apparatus 1*e* including the detection apparatus 3 and some other first control target apparatus 1 of the plurality of first control target apparatuses 1, and the second control target apparatus 2 will be described.

In step S21, the detection unit 32 of the first control target apparatus 1*e* detects the temperature distribution of the areas 9 within the room α.

In step S22, the determination unit 33 determines, with respect to each area 9, whether the temperature of the area 9 is within a predetermined range (e.g., 30° C. to 35° C.), and the generation unit 34 generates heat source data based on the determination result.

In the following, the process of generating the heat source data is described with reference to FIGS. 12A and 12B. FIG. 12A illustrates an example temperature distribution of nine areas 9 detected by the detection unit 32. Based on the detected temperature distribution as illustrated in FIG. 11A, the generation unit 34 generates heat source data as illustrated in FIG. 12B, for example. As can be appreciated, the heat source data of FIG. 12B is represented by heat source presence/absence information indicating whether a heat source is present in each area 9. Specifically, an area 9 where the detected temperature is within a predetermined range (e.g., 30° C. to 35° C.) is represented by "1" indicating that a heat source is present, and an area 9 where the detected temperature is outside the predetermined temperature range (e.g., below 30° C. or above 35° C.) is represented by "0" indicting that a heat source is not present. The temperature distribution of FIG. 12A and the heat source data of FIG.

12B are actually obtained from the distorted detection cell 502, but for ease of explanation the detection cell 502 is represented by a rectangle.

Referring back to FIG. 11A, in step S23, the detection unit 32 of the first control target apparatus 1e detects the illuminance, the temperature, and the humidity near the first control target apparatus 1e.

In step S24, the transceiver unit 31 of the first control target apparatus 1e transmits detection data to the management system 8. The detection data includes the heat source data generated in step S22, temperature and humidity data (including temperature data used for generating the heat source data) and illuminance data indicating the detection results obtained in step S23. As a result, the transceiver unit 81 of the management system 8 receives the detection data. Note that the temperature data used for generating the heat source data is preferably temperature data for each detection cell, but the temperature data used may also be an average of the temperatures of some or all of the areas 9, for example. In this way, the load on the management system 8 may be prevented from increasing, for example. In this case, the temperatures of the areas 9 may be regarded as the same, for example.

FIG. 13 illustrates an example of heat source data obtained by synthesizing heat source data transmitted from a plurality of first control target apparatuses 1 including the detection apparatus 3. FIG. 13 is a conceptual diagram of heat source data indicating the presence/absence of a heat sources in all the areas 9 within the room α. The heat source data illustrated in FIG. 12B corresponds to the heat source data of block B on the upper left portion of FIG. 13.

In step S24-2, a cell/area conversion unit 85 of the management system 8 reads the cell/area correspondence table from the cell/area correspondence DB 8005 and converts the heat source data into heat source data corresponding to the area 9. Details is described with reference to FIG. 18.

In step S25, the read/write process unit 89 of the management system 8 reads out the layout information as illustrated in FIG. 7A from the layout management DB 8001, for example.

In step S26, the comparison unit 82 compares the layout information of FIG. 7A with the heat source data of FIG. 13. By comparing the layout information and the heat source data, for example, it can be determined that a heat source is present in the area 9 of the layout information where the first control target apparatus 1a is installed (with the area ID "a11") based on the value "1" indicated as the heat source data for the corresponding area 9.

In step S27-1, the read/write process unit 89 of the management system 8 uses the values "1" and "0" indicating the presence/absence of a heat source of the heat source data as search keys to search for a corresponding light output (amount of light) from the first control guideline management table of the control guideline management database 8002 and reads the corresponding light output.

In step S27-2, the read/write process unit 89 of the management system 8 reads (acquires) the second control guideline management table from the control guideline management DB 8002 and reads (acquires) the control area management table from the control area management DB 8003.

In step S28, the generation unit 84 generates control data indicating the light output (amount of light) for the first control target apparatus 1. Further, the generation unit 84 generates control data for the second control target apparatus 2. In this way, based on one set of detection data transmitted in step S24 (based on the same detection data), both control data for the first control target apparatus 1 and control data for the second control target apparatus 2 may be generated. Thus, in a case where both the first control target apparatus 1 and the second control target apparatus 2 are controlled, the number of times the detection apparatus 3 performs detection and the number of time the management system 8 receives detection data may be reduced by half, for example. Also, by using the same detection data, consistency of the operations of the first control target apparatus 1 and the second control target apparatus 2 may be easily achieved, for example.

In steps S29-1 and S29-2, the transceiver unit 81 of the management system 8 transmits corresponding control data to each of the first control target apparatuses 1. In turn, the transceiver unit 31 of the first control target apparatus 1e receives the control data. Also, the transceiver unit 51 of the first control target apparatus 1 other than the first control target apparatus 1e receives the control data.

In steps S30-1 and S30-2, the control unit 35 of the first control target apparatus 1e generates a control signal to be output to the control target unit 20 implemented by the LED lamp 130 based on the received control data. Similarly, the control unit 55 of the first control target apparatus 1 other than the first control target apparatus 1e generates a control signal to be output to the control target unit 20 implemented by the LED lamp 130 based on the received control data.

In steps S31-1 and S31-2, the control unit 35 outputs the generated control signal to the control target unit 20. The control unit 55 outputs the generated control signal to the control target unit 20.

In steps S32-1 and S32-3, the amount of light output by each LED lamp 130 as the control target unit 20 is controlled based on the control signal.

In step S33, the transceiver unit 81 of the management system 8 transmits control data to the second control target apparatus 2. In turn, the transceiver unit 51 of the second control target apparatus 2 receives the control data.

In step S34, based on the received control signal, the temperature, the humidity, the air volume, and the air flow direction of the air conditioner as the control target unit 20 are controlled.

For example, based on FIG. 13, it can be determined that there is no heat source in the area 9 having the area ID "a22" (because "0" is indicated as the heat source data for the corresponding area 9). Thus, based on the first control guideline management table of FIG. 8A, the amount of light to be output by the first control target apparatus 1 installed in the area 9 with the area ID "a22" is controlled to 60%. On the other hand, according to FIGS. 12A and 12B, a heat source is present directly below the area 9 with the area ID "a21" (because "1" is indicated as the heat source data for the corresponding area 9). Thus, based on the first control guideline management table of FIG. 8A, the amount of light to be output by the first control target apparatus 1 installed in the area 9 with the area ID "a21" is controlled to 100%.

In this way, when a heat source is detected due to the presence of a person, the light output of the LED lamp may be set to a maximum value, and when a heat source is not detected due to the absence of a person, the light output of the LED lamp may be lowered to thereby realize energy conservation, for example. Also, because the amount of light to be output is increased when a person is present, comfort may be improved, for example.

<Determination of Presence/Absence of Heat Source>

In the following, an example methods for determining the presence/absence of a heat source in step S22 of FIG. 11A is described.

Figures 14, 15A, 15B:
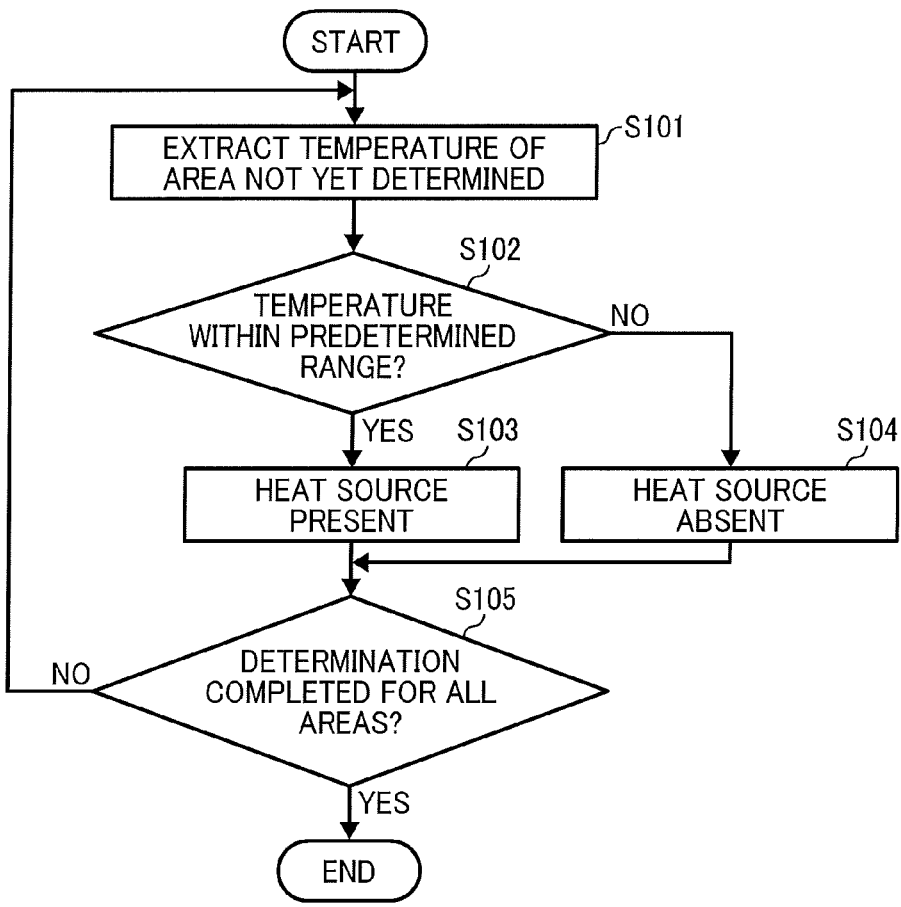
FIG. 14 is a flowchart illustrating an example method of generating heat source data according to a first pattern.
FIGS. 15A and 15B are example conceptual diagrams of temperature distribution data and heat source data for describing the first pattern.

FIG. 14 is a flowchart illustrating an example method of generating heat source data. FIG. 15A is an example conceptual diagram of temperature distribution data, and FIG. 15B is an example conceptual diagram of heat source data indicating the presence/absence of a heat source.

First, in step S101, the generation unit 84 of the management system 8 extracts, from the temperature distribution data, an area 9 for which the determination unit 33 has not yet determined whether a corresponding temperature is within a predetermined range (e.g., 30° C. to 35° C.).

Then, in step S102, the determination unit 33 determines whether the temperature of the area 9 extracted in step S101 is within the predetermined range. For example, referring to FIG. 15A, when an electric pot (water heater) is installed in the area 9 where the first control target apparatus 1 with the apparatus ID "a13" is installed, steam or heat emitted by the electric pot may cause the temperature of this area 9 to rise to 60° C., for example. In such a case, even if a heat source is present, the temperature of the heat source is not within the range of a heat source corresponding to a human being (e.g., 30° C. to 35° C.), and as such, the determination unit 33 preferably does not detect that a person is present.

When the determination unit 33 determines in step S102 that the temperature of the extracted area 9 is within the predetermined range (YES in step S102), the determination unit 33 determines that a heat source is present (step S103). In this case, as illustrated in FIG. 15B, "1" indicating that a heat source is present is set up as the heat source data for the extracted area 9.

On the other hand, if the determination unit 33 determines that the temperature of the extracted area 9 is not within the predetermined range (NO in step S102), the determination unit 33 determines that no heat source is present (step S104). In this case, as illustrated in FIG. 15B, "0" indicating that there is no heat source is set up as the heat source data for the extracted area 9.

After executing the process of step S103 or step S104, the determination unit 33 determines whether the determination of whether a temperature of an area 9 is within the predetermined range has been completed with respect to all the areas 9 (step S105). If it is determined in step S105 that the determination has been completed with respect to all the areas 9 (YES in step S105), the process of step S22 of FIG. 10 is ended. On the other hand, if it is determined in step S105 that the determination has not yet been completed with respect to all the areas 9 (NO in step S105), the process returns to step S101.

As described above, according to the process illustrated in FIG. 14, even when a heat source is present, if the temperature of the heat source is outside the temperature range of a specific object (e.g., human being) to be detected as a heat source, it is assumed that no heat source is present. In this way, the presence of a human being may be more accurately detected, and as a result, energy conservation may be more accurately implemented.

<Correlation Between Heat Source Data and Area>

Subsequently, the conversion of the heat source data in step S24-2 in FIG. 11A is described. As described with reference to FIG. 1, the shape of the detection area 501 of the heat source data is distorted by the mounting angle of the temperature distribution sensor 311. Therefore, the process of step S24-2 is performed. In order to perform step S24-2, a cell/area correspondence table is necessary. First, a method of creating a cell/area correspondence table is described.

Figure 16A:
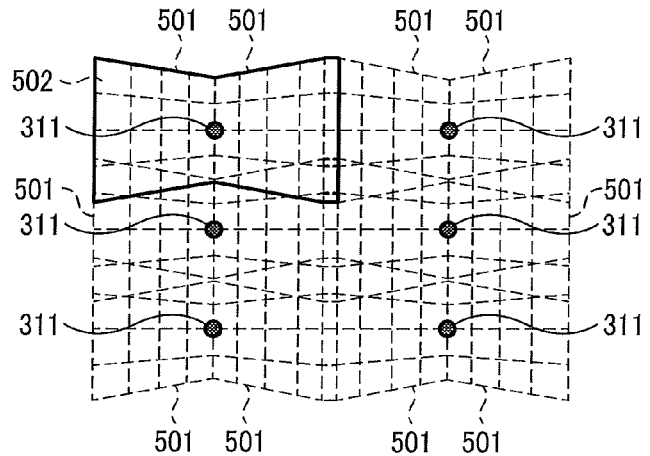
FIG. 16A-16C are diagrams describing detection areas detected by two temperature distribution sensors.

FIG. 16A shows the detection area 501 detected by the two temperature distribution sensors 311. In FIG. 16A, a total of six first control target devices 1 are shown. One first control target device 1 has two temperature distribution sensors 311. One temperature distribution sensor 311 further has 4×4 thermopile sensors. That is, one temperature distribution sensor 311 can detect temperatures of 16 places in parallel. The detection area 501 of one thermopile sensor is called a detection cell 502.

Since the temperature distribution sensor 311 is not installed perpendicular to the floor surface, the detection area 501 and the detection cell 502 are distorted in a trapezoidal shape. Therefore, the heat source data transmitted from the detection device 3 to the management system 8 is also obtained in such the shape.

Figure 16B:
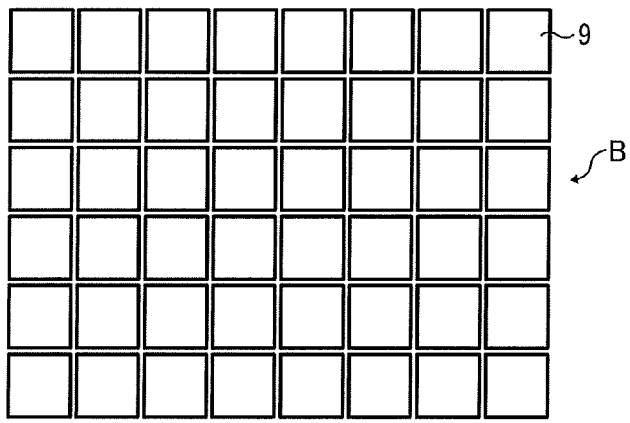

FIG. 16B is an example of a diagram schematically showing the area of the room α. Since there is no distortion in the area 9 of the living room α, it is necessary to make the presence/absence of the heat source in each detection cell 502 of the heat source data correspond to each area 9 of the room α.

Figure 16C:
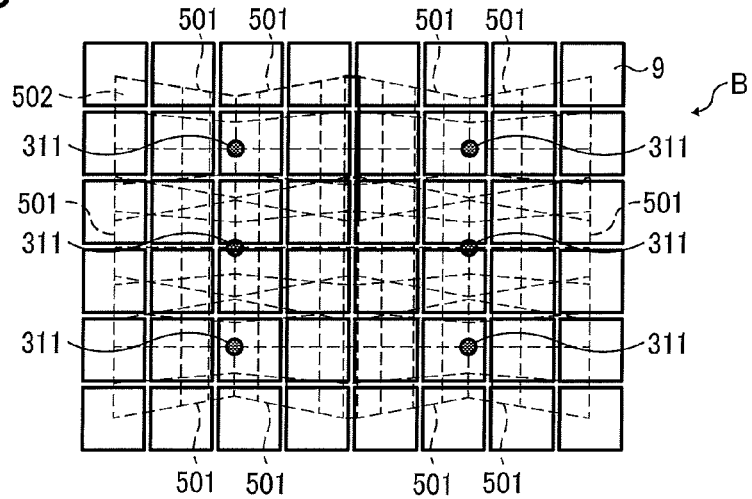

FIG. 16C is a diagram in which FIG. 16A and FIG. 16B are superimposed. The cell/area conversion unit 85 of the management system 8 associates each area 9 in FIG. 16B with the detection cell 502 in FIG. 16A and sets the heat source data (Presence or absence of heat source) of the detection cell 502 of the thermopile sensor overlapping the area 9 in each of the areas 9. Since one region 9 may include a plurality of detection cells 502, when a plurality of detection cells 502 correspond to one region 9, the logical sum of the presence or absence of the heat source is set to the region 9.

The position and depression angle of the detection cell 502 and the coordinates of the area 9 are used for the process of which the detection cell 502 corresponds to which area 9.

Figure 17:
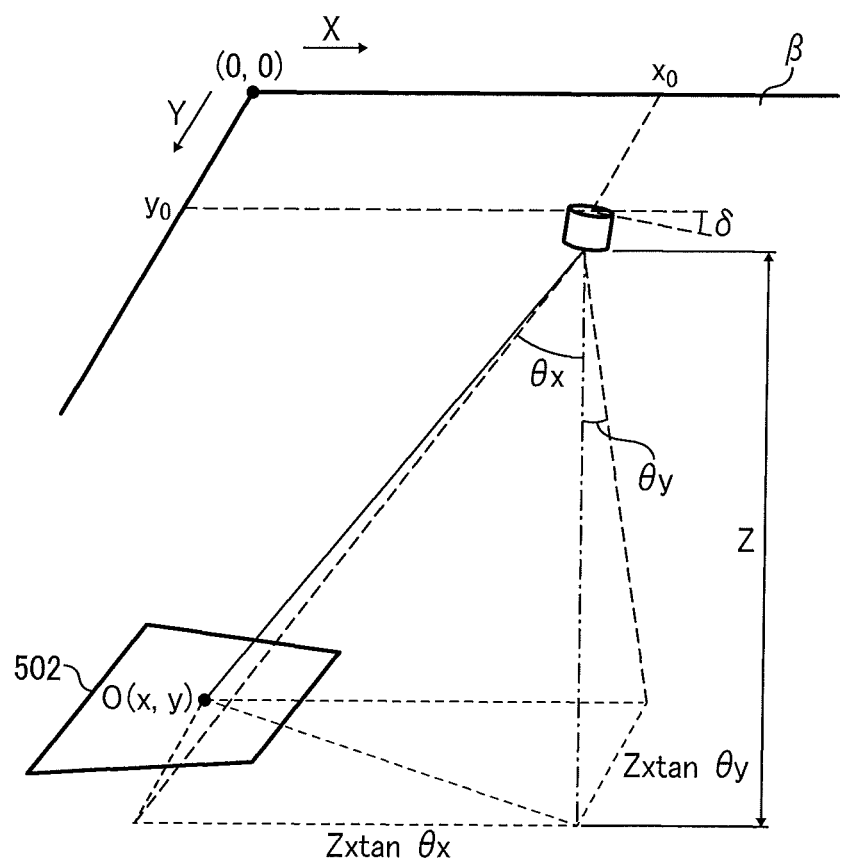
FIG. 17 is a diagram illustrating a correspondence between thermopile sensor and an area.

FIG. 17 is an example of a diagram for explaining correspondence between the thermopile sensor and the region 9. FIG. 17 is an example of a diagram for explaining the center coordinate O of the detection cell detected by the thermopile sensor. The position (xo, y0) of the thermopile sensor in the ceiling β is given as, for example, the corner of the ceiling as the origin (0, 0). The height Z of the ceiling β is also given. It is assumed that depression angles θx, θy with respect to the floor of each thermopile sensor are given. θx is a depression angle in the X direction, and θy is a depression angle in the Y direction.

As a result, the center coordinate O of the detection cell detected by one thermopile sensor is given by (x0−Z tan θx, y0−Z tan θy). The depression angles θx and θy are determined by the mounting angle of the detection device 3 to the first control target device 1 and the center angle (Angle when installed vertically to the installation surface such as the ceiling) of the detection direction given from the manufacturer of each thermopile sensor. That is, since the center angle in the detection direction of each thermopile sensor is given by the manufacturer or the like, θx, θy can be obtained by adding the attachment angle δ of the detection device 3 to the first control target device 1 to this value. It is to be noted that θx and θy in the figure are shown in a state that the attachment angle δ is included. The position (xo, y0), depression angle θx, θy, and attachment angle δ of the thermopile sensor are information related to the position of the detection cell 502 formed by the thermopile sensor.

The coordinates of the area 9 are registered in the area information DB 8004. Therefore, the cell/area correspondence table generation unit 83 can judge where in the area 9 the center coordinate O of each detection cell 502 is included.

It is possible to compare whether or not any one or more of the four corners of the detection cell 502 is included in the region 9, instead of comparing whether the center coordinate O of the detection cell 502 is included in the region 9. When judging whether or not all the four corners are included in the area 9, the number of the areas 9 having the heat source tends to increase. Therefore, it is effective in estimating the possibility that a person is highly estimate and wishing to control lighting, air conditioner and the like.

Also, when calculating the center coordinate O of the detection cell 502, it is possible to use the height of a person instead of the height Z of the ceiling β. For example, the height of a person is "Z-110 cm". Thereby, it becomes easier to associate the detection mass 502 with the area 9 in which the person actually exists.

Figure 18:
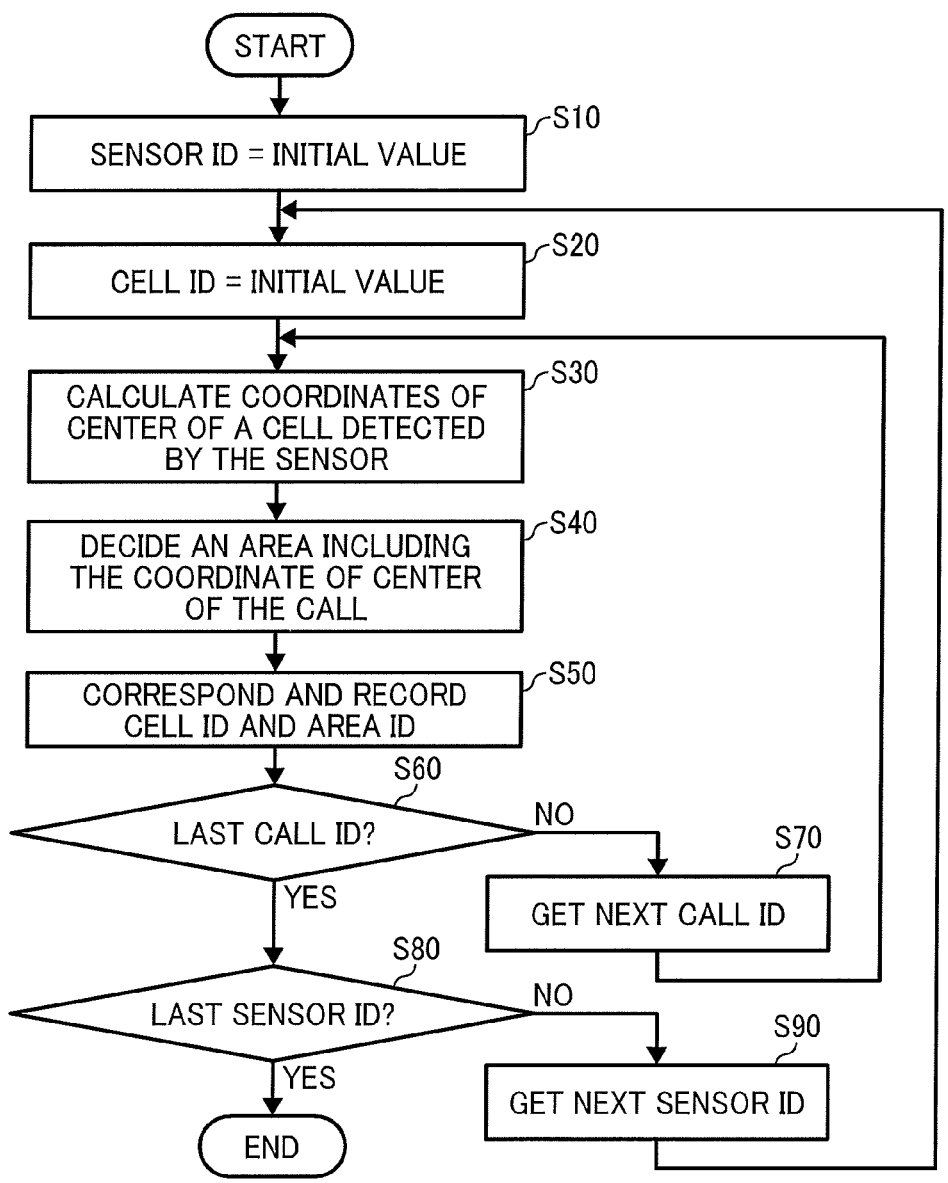
FIG. 18 is a flowchart illustrating a process implemented by the management system for associating a detection cell of a detection area with a corresponding area.

FIG. 18 is an example of a flowchart for associating the detection cell 502 of the detection area 501 with the area 9 by the mass/area correspondence table generation unit 83 of the management system 8.

First, the cell/area correspondence table generation unit 83 sets an initial value to the sensor ID of the temperature distribution sensor 311 (step S10). The sensor ID is an identification number assigned to the temperature distribution sensor 311 in order to facilitate processing.

Next, the cell/area correspondence table generation unit 83 sets an initial value to the cell ID (step S20). The cell ID is as described above.

The cell/area correspondence table generation unit 83 determines the center coordinate O of the detection cell of the thermopile sensor of interest (step S30).

Then, the cell/area correspondence table generation unit 83 determines the area 9 including the center coordinate O of the detection cell 502 of the thermopile sensor of interest (step S40).

Then, the cell/area correspondence table generation unit 83 registers the cell ID and the area ID in association with each other in the cell/area correspondence table (step S50). Thereby, the cell/area correspondence table as shown in FIG. 10B is generated.

Next, the cell/area correspondence table generation unit 83 judges whether processing has been performed up to the last cell ID of one temperature distribution sensor 311 (step S60). If the determination in step S60 is No, the cell/area correspondence table generation unit 83 extracts the next cell ID (step S70). Then, steps S30 to S60 are repeated.

If the determination in step S60 is Yes, the cell/area correspondence table generation unit 83 determines whether or not it is the last sensor ID (step S80). In other words, it is determined whether or not processing has been performed up to the last temperature distribution sensor 311. If the determination at step S80 is No, the cell/area correspondence table generation unit 83 extracts the next sensor ID (S90). That is, steps S30 to S70 are repeated for another temperature distribution sensor 311. When the determination in step S80 is Yes, the process of FIG. 18 ends.

If the process of the flowchart of FIG. 18 is carried out after the first controlled object apparatus 1*e* is installed on the ceiling, the cell/area conversion section 85 refers to this cell/area correspondence table, and thus the cell/area conversion section 85 can convert the heat source data obtained from the detection device 3 into heat source data corresponding to the region 9. Therefore, the load on the management system 8 can be reduced.

Figure 19:
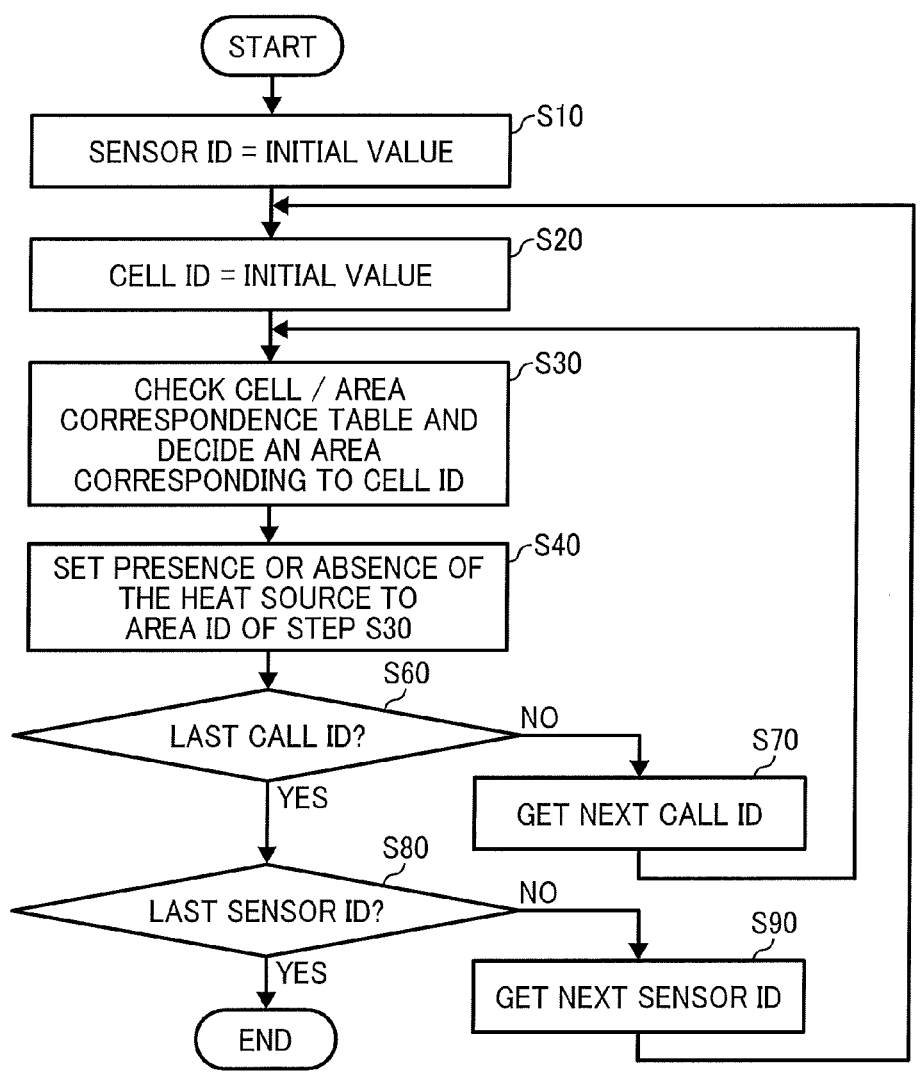
FIG. 19 is a diagram illustrating conversion of heat source data by the management system.

FIG. 19 is an example of a diagram for explaining conversion of heat source data by the cell/area conversion unit 85. Since the processing in FIG. 19 is similar to the processing in FIG. 18, mainly the difference from the processing in FIG. 18 will be described.

In step S30, the cell/area conversion unit 85 refers to the cell/area correspondence table and determines the area ID corresponding to the cell ID.

In step S40, the cell/area conversion unit 85 sets the presence or absence of a heat source to the area ID determined in step S30. The subsequent processing may be the same as the processing of FIG. 18. Through the above processing, the heat source data obtained in a distorted shape can be made to correspond to the area 9.

<Exemplary Control Using Heat Source Data>

Instead of associating the first control target device 1 with one area 9, by correlating one first control target device 1 with a plurality of areas 9, the device control system 100 can perform finer control.

Figure 20:
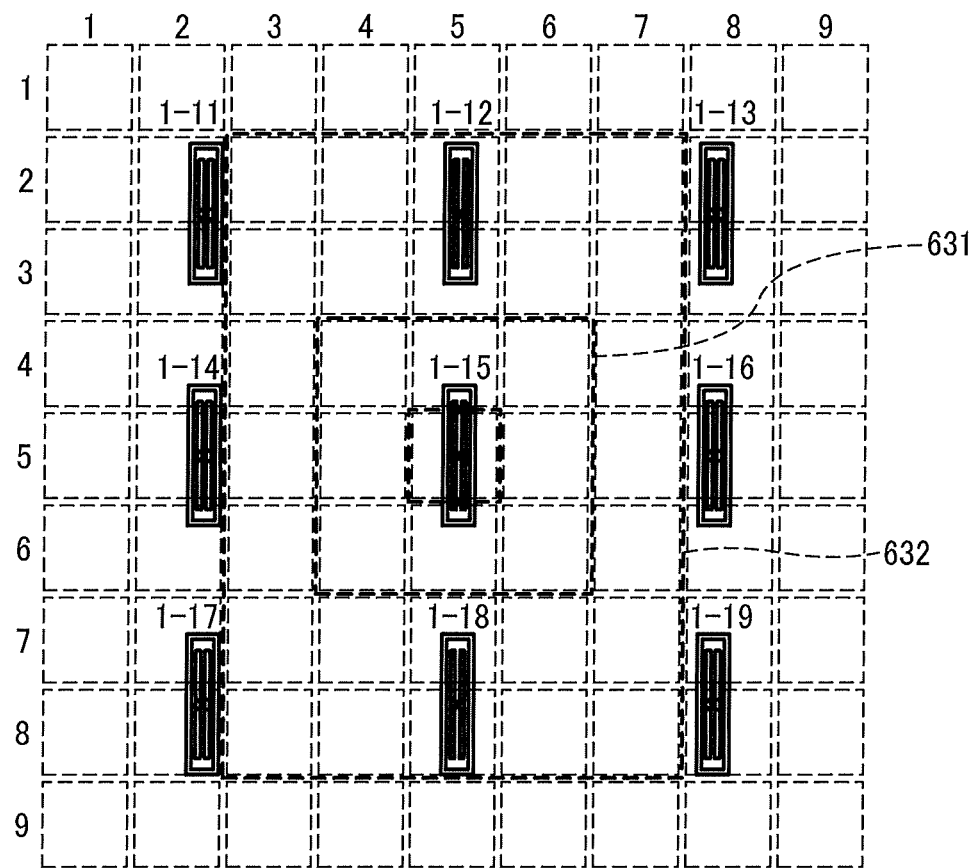
FIG. 20 is a diagram illustrating conversion of heat source data by the management system.

FIG. 20 is an example of a diagram for explaining correspondence between the first control target device 1 and the area 9. In FIG. 20, it should be noted that the relationship between the area 9 and the first control target device 1 is different from that in FIG. 7A and the like. In FIG. 20, the room is divided into 9×9=81 areas 9. In addition, the number of the first control target devices 1 is 9. Device IDs of the first control target devices are 1-11 to 1-19, and area IDs are represented by line numbers and column numbers of area 9.

An administrator or the like of the device control system 100 can register in advance the distance from the heat source necessary for lighting and how to light on the first control target device 1. For example, the area 9 is sorted out from inner moat 631 (inside of a predetermined distance from the first control target device 1) and outer moat 632 (inside of a distance outside a predetermined distance from the first control target device 1). The inner moat 631 refers to an inner area 9 including immediately below the first control target apparatus 1, and the outer moat 632 refers to the area 9 outside the inner moat 631 around the first control target apparatus 1. In FIG. 20, areas (4, 4) (4, 5) (4, 6) (5, 4) (5, 5) (5, 6) (6, 4) (6, 5) (6, 6) are included in area 9 of an inner moat 631. Areas (2, 3) (2, 4) (2, 5) (2, 6) (2, 7) (3, 3) (3, 4) (3, 5) (3, 6) (3, 7) (4, 3) (4, 7) (5, 3) (5, 7) (6, 3) (6, 7) (7, 3) (7, 4) (7, 5) (7, 6) (7, 7) (8, 3) (8, 4) (8, 5) (8, 6) (8, 7) are included in area 9 of the outer moat 632.

The generation unit 84 of the management system 8 can control the light amount of the first control target device 1-15 depending on whether there is a heat source in the inner moat 631 or a heat source in the outer moat 632 with respect to the first control target device 1-15.

Figure 21A:
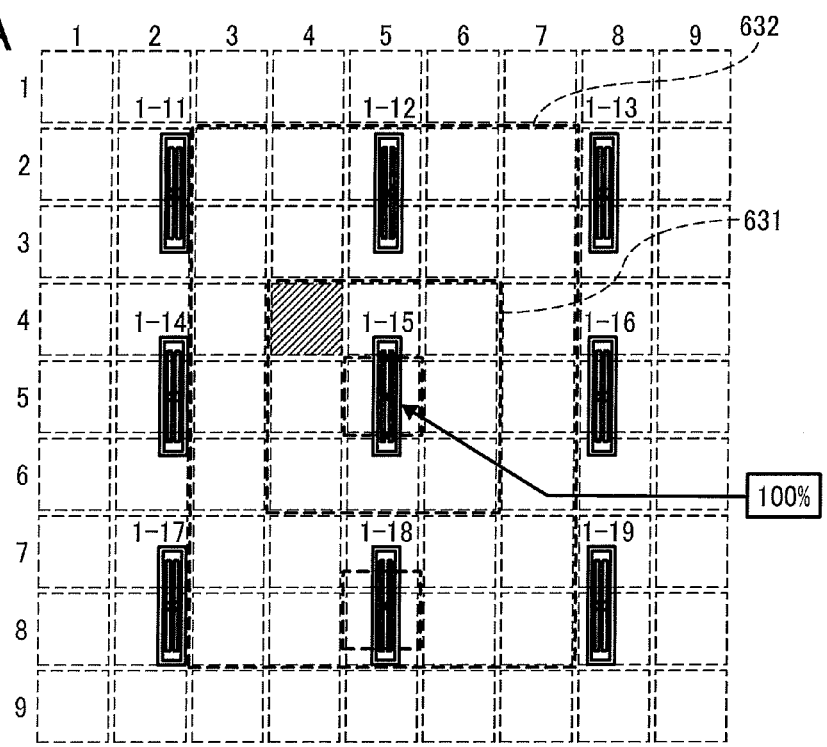
FIGS. 21A-21C are diagrams illustrating first control target apparatuses, areas and the correspondence.
Figure 21B:
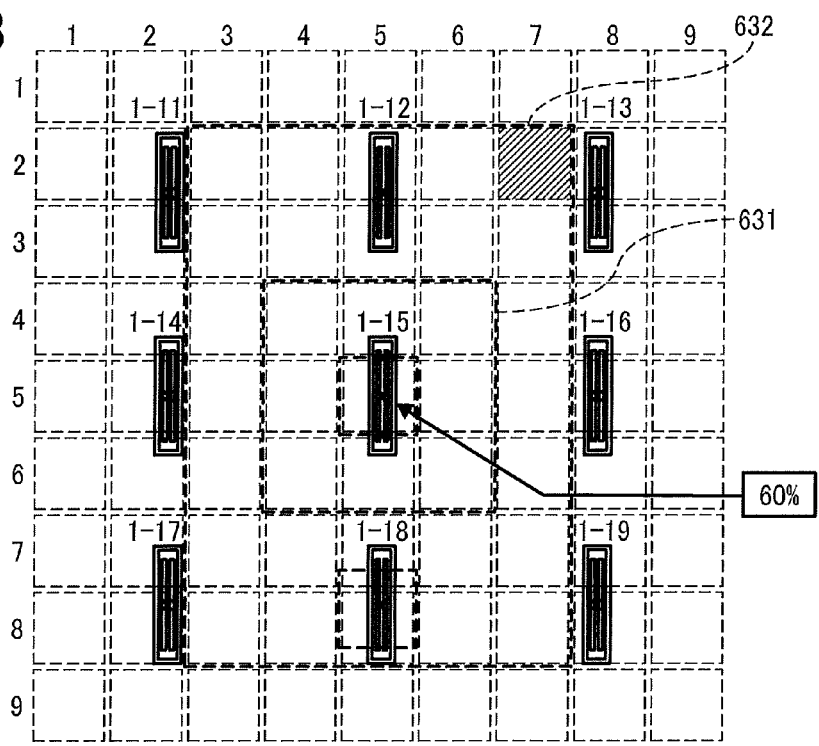
Figure 21C:
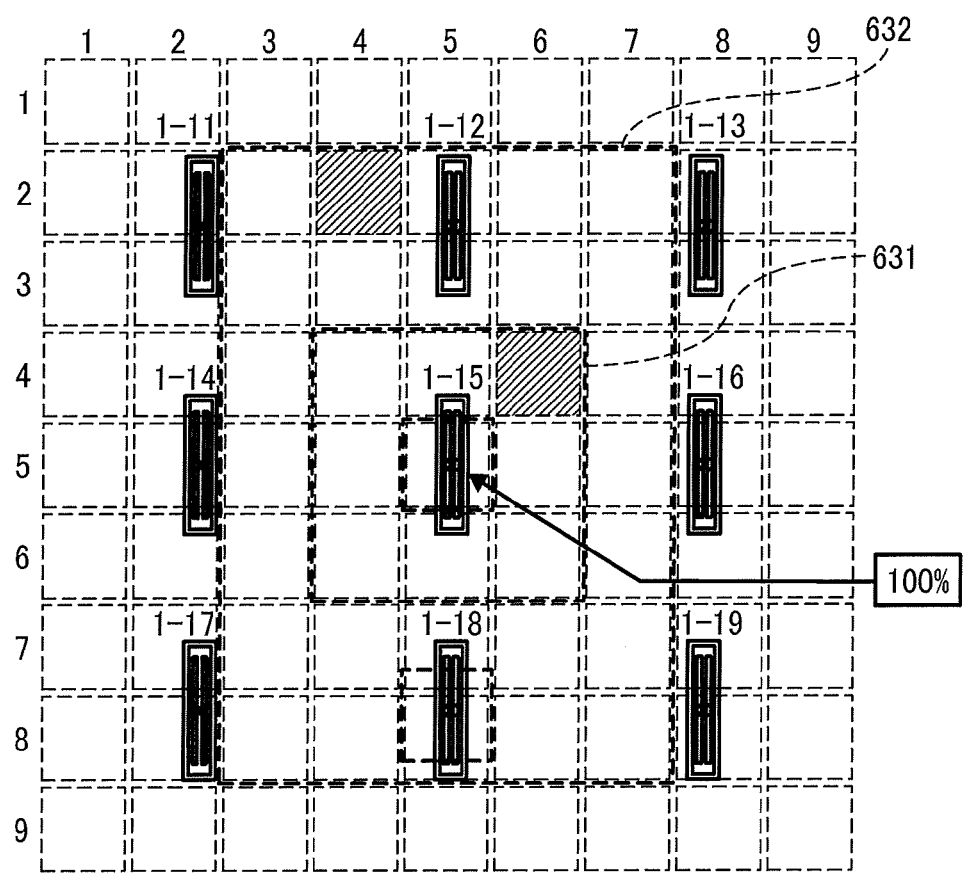

FIGS. 21A-21C are examples of diagrams schematically explaining the control of the light amount of the first control target device 1-15. In FIG. 21A, the area ID=(4, 4) has a heat source (people are present). Since the inner moat 631 has a heat source, the first control target device 1-15 lights the LED lamp 100%. In FIG. 21B, the area ID=(2, 7) has a heat source (some people). Since the outer moat 632 has a heat source, the first control target device 1-15 lights up the LED lamp by 60%. In FIG. 21C, the area ID=(2, 4) (4, 6) has a heat source (people are present). Since the inner moat 631 has a heat source, the first control target device 1-15 lights the LED lamp 100%.

Therefore, the amount of light can be controlled according to the distance from the first control target device 1-15 to the heat source. Such control is effective for the control guidance that it is desired to keep the brightness a little bright at night in area 9 where no person is present. In order to further improve the energy saving property, the light quantity of the outer moat 632 can be set to 10%, etc., and it is possible to control both energy conservation and comfort in accordance with the presence or absence of the heat source.

Such control guidelines are registered in the first control guideline management table of the control guideline management DB 8002. FIG. 22 shows an example of the first control guideline management table. In the first control guideline management table of FIG. 22, the device ID of the first control target device is associated with the area 9 that controls the light amount to 100% when there is a heat source. In the first control guideline management table, the device ID of the first control target device is associated with the area 9 which controls the light amount to 60% when there is a heat source. The area 9 for controlling the light quantity to 100% is the inner moat 631 in FIG. 21 and the area 9 for controlling the light quantity to 60% is the outer moat 632.

The shape of the area 9 with the light amount of 100% and the shape of the area 9 with the light amount of 60% are not limited to the shapes of the inner moat 631 and the outer moat 632, and the administrator or the like can arbitrarily set the shape. In addition, the area 9 may be associated with the first control target device by dividing the light amount into three or more levels.

Figure 23:
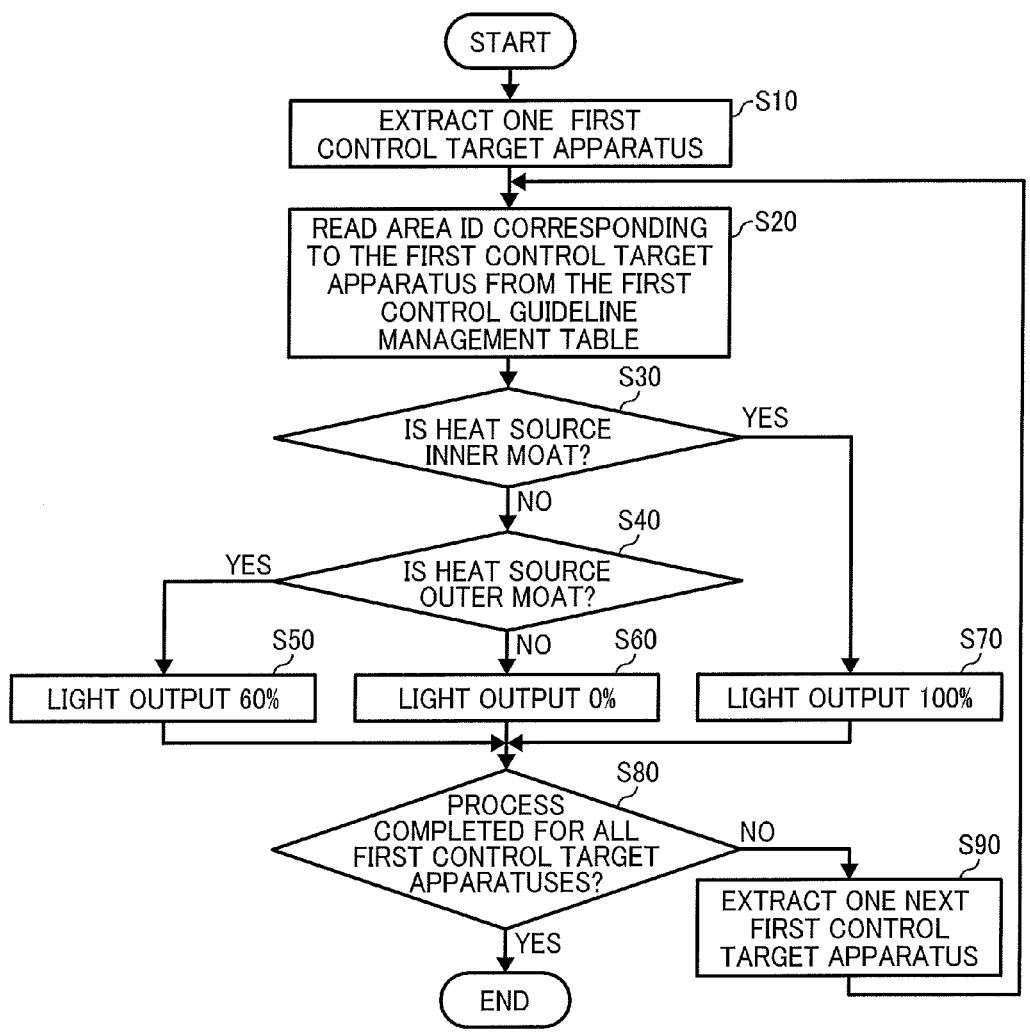
FIG. 23 is a flowchart illustrating an example process implemented by the management system for generating control data for the first control target apparatus.

FIG. 23 is an example of a flowchart of a procedure in which the generation unit 84 of the management system 8 generates the control data of the first control target device 1. The process in FIG. 23 is performed in step S28 in FIG. 11B.

First, the generation unit 84 takes out one of the first control target devices 1 to be controlled in the room (step S10).

Next, the generation unit 84 reads the area ID associated with the first control target device from the first control guideline management table (step S20). The inner moat 631 and the outer moat 632 are respectively read out. Since the coordinates of the temperature distribution sensor 311 are known, the area 9 to which the coordinates of the temperature distribution sensor 311 belong may be retrieved from the area information DB 8004. If the area 9 is specified, the inner moat and the outer moat are also specified.

The generating unit 84 determines whether there is a heat source (there is a person) in the inner moat 631 (step S30).

If the determination in step S30 is Yes, the generation unit 84 generates control data for setting the light amount of the first control target device 1 to 100% (step S70).

If the determination in step S30 is No, the generating unit 84 determines whether there is a heat source (there is a person) in the outer moat 632 (step S40).

When the determination in step S40 is Yes, the generation unit 84 generates control data for setting the light amount of the first control target device 1 to 60% (step S50).

If the determination in step S40 is No, the generation unit 84 generates control data for setting the light quantity of the first control target device 1 to 0% (step S60).

The generation unit 84 determines whether the control data of all the first control target devices 1 has been created (step S80).

If the determination in step S80 is No, the process proceeds to step S90, and the generation unit 84 extracts one next first control target device (step S90). When the determination in step S80 is Yes, the processing in FIG. 23 ends.

In this manner, the management system 8 generates control data of the first control target device 1 (and the second control target device 2) for each first control target device 1 every time the management system 8 obtains the heat source data. As a result, it is possible to always maintain optimum control and to achieve control that is compatible with energy saving and comfort.

Figure 24A:
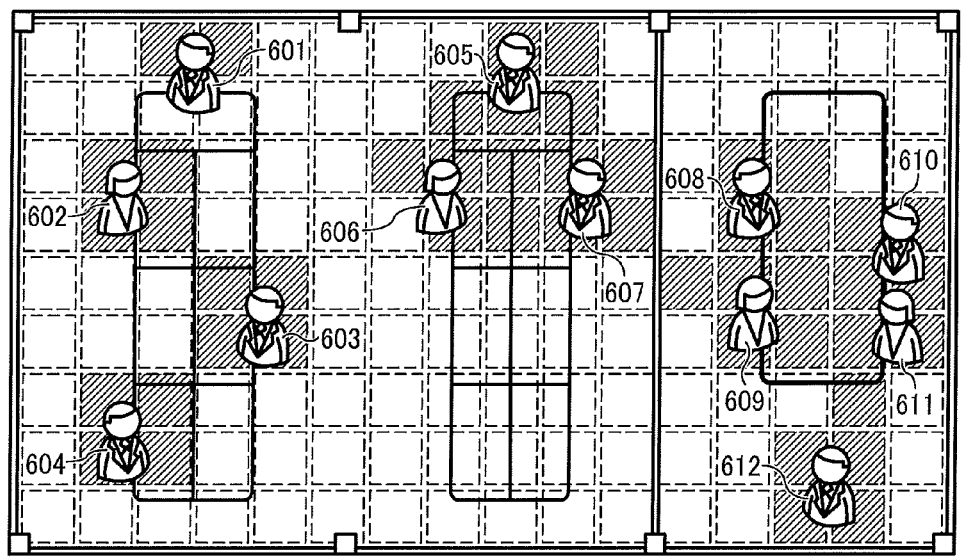
FIGS. 24A and 24B are diagrams illustrating a presence or absence of a heat source and control of the first control target device.
Figure 24B:
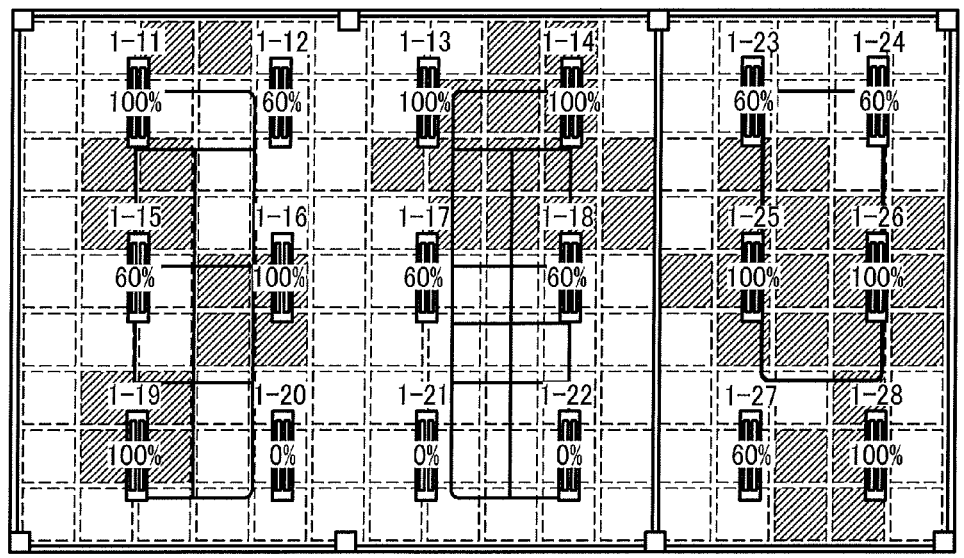

FIG. 24A and FIG. 24B are examples of diagrams for explaining the presence/absence of a heat source and a control example of the first control target device 1. FIG. 24A shows an area in which a person actually exists. FIG. 24B shows the first controlled object apparatus 1 and the light quantity. In FIG. 24A and FIG. 24B, it is detected that there is a heat source in the hatched portion.

A heat source based on the person 601 and the person 602 are detected in the inner moat of the first control target apparatus 1-11. Therefore, the first control target device 1 lights up at 100% of the amount of light.

The inner moat of the first control target device 1-12 is only the area directly below. However, since the heat source based on the person 601 is detected at the outer moat, the first control target device 1-12 light up at 60% of the amount of light.

A heat source based on the person 605 is detected at the inner moat of the first control target device 1-13. For this reason, the first control target device 1-13 light up at 100% of the amount of light.

A heat source based on the person 605 is detected at the inner moat of the first control target device 1-14. For this reason, the first control target device 1-14 light up at 100% of the amount of light.

The inner moat of the first control target device 1-15 is only the area immediately below. However, since the heat source based on the person 602 and the person 603 are detected in the outer moat, the first control object apparatus 1-15 light up at 60% of the amount of light.

A heat source based on the person 603 is detected in the inner moat of the first control target device 1-16. For this reason, the first control target device 1-16 light up at 100% of the amount of light.

The inner moat of the first control target device 1-17 is only in the region directly below. However, since the heat source based on the person 606 is detected at the outer moat, the first control target device 1-17 light up at 60% of the amount of light.

The inner moat of the first control target device 1-18 is only in the region directly beneath. However, since the heat source based on the person 607 is detected at the outer moat, the first control target device 1-18 light up at 60% of the amount of light.

A heat source based on the person 604 is detected in the inner moat of the first control target apparatus 1-19. As a result, the first control target device 1-19 light up at 100% of the amount of light.

The inner moat and the outer moat of the first control target device 1-20 heat source are not detected. Therefore, the first control target device 1-20 light up at 0% of the amount of light.

The inner moat and the outer moat of the first control target device 1-21 heat source are not detected. As a result, the first control target device 1-21 light at 0% of the amount of light.

The inner moat and the outer moat of the first control target device 1-22 heat source are not detected. As a result, the first control target device 1-22 light at 0% of the amount of light.

The inner moat of the first control target device 1-23 is only in the region directly beneath. However, since a heat source based on the person 608 is detected at the outer moat, the first control target device 1-23 light up at 60% of the amount of light.

Inner moat of the first control target device 1-24 is only in the region directly below. However, since the heat source is detected on the basis of the person 608 in the outer moat, the first control target device 1-24 light up at 60% of the amount of light.

A heat source based on the person 609 is detected in the inner moat of the first control target device 1-25. Therefore, the first control target device 1-25 light up at 100% of the amount of light.

A heat source based on the person 610 is detected at the inner moat of the first control target device 1-26. Therefore, the first control target device 1-26 light up at 100% of the amount of light.

The inner moat of the first control target device 1-27 is only in the region immediately below. However, since the heat source based on the person 612 is detected at the outer moat, the first control target device 1-27 light up at 60% of the amount of light.

A heat source based on the person 612 is detected in the inner moat of the first control target device 1-28. Therefore, the first control target device 1-28 light up at 100% of the amount of light.

As described with reference to FIG. 24, the amount of light can be controlled for each of the first control target devices 1 depending on whether or not there is a heat source in inner moat (near region) or outer moat (far region). Therefore, it is possible to provide lighting that achieves energy saving and does not reduce comfort.

<Setting of Division Number of Detection Cell>

Figure 25A:
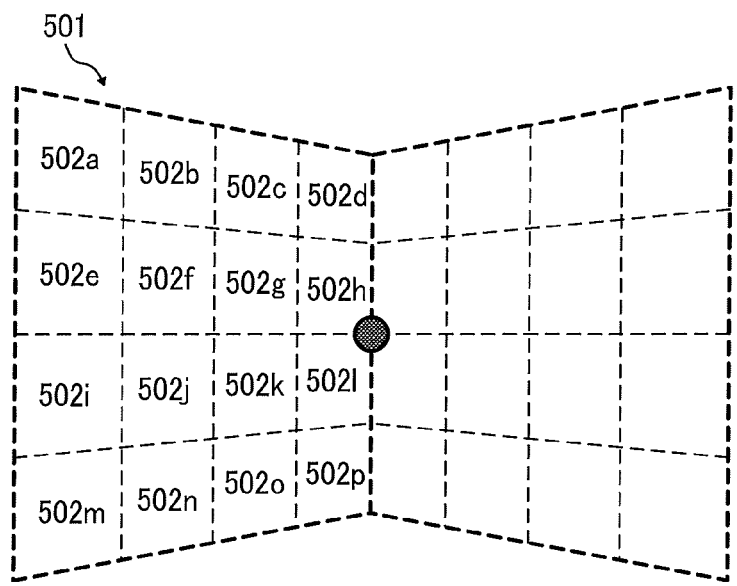
FIGS. 25A and 25B are diagrams illustrating a set up number of division of detection cell.

The number of detection cells 502 can be changed by an administrator or the like. The upper limit of the number of detection cells 502 is the number of thermopile sensors. FIG. 25A shows a detection area of a temperature distribution sensor 311 having a 4×4 thermopile sensor. The administrator can reduce the number of divisions to be less than the number of thermopile sensors. The number of divisions is set to, for example, 8, 4, 2, etc., for example. For example, when the division number is 8, the detection cell 502a and the detection cell 502b, the detection cell 502c and the detection cell 502d, the detection cell 502e and the detection cell 502f, the detection cell 502g and the detection cell 502h, the detection cell 502i, the detection cell 502j, the cell 502k and the detection cell 502l, the detection cell 502m and the detection cell 502n, the detection cell 502o and the detection cell 502p are respectively coupled.

In this case, the cell/area correspondence table generation unit 83 of the detection device 3 calculates the midpoint of the center coordinates O of the two detection cells before combination as the center coordinates O of the combined detection cells. Therefore, similarly distorted heat source data can be converted in association with the area 9.

Further, the detection unit 32 calculates the average of the temperatures of the detection cells before combination. The generation unit 34 of the detection device 3 generates heat source data based on the average. Therefore, similarly distorted heat source data can be converted in association with the area 9.

Figure 25B:
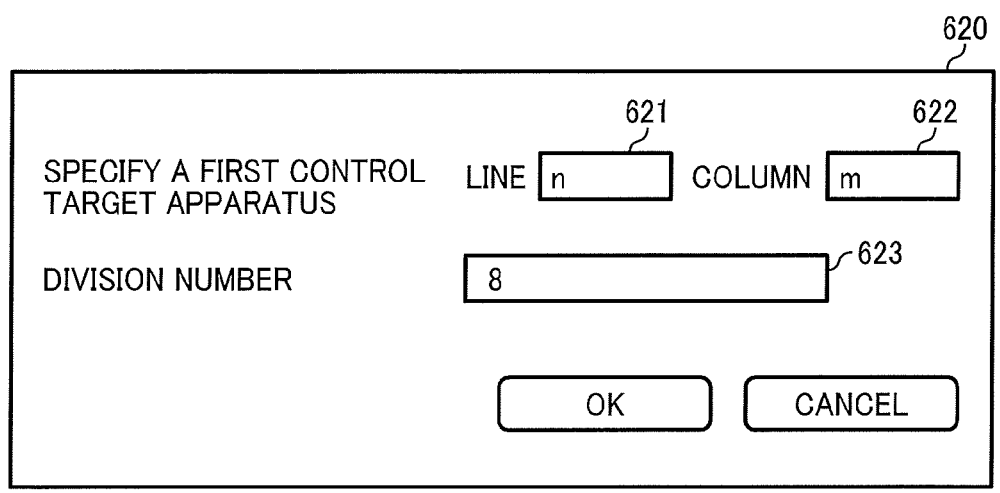

FIG. 25B is a diagram showing an example of a reception screen for receiving the number. The reception screen 620 is, for example, an output (e.g. a Web page) displayed on the administrator PC 7. The reception screen 620 has a row input column 621 and a column input column 622 for specifying the first control target device. Further, it has a division number input column 623. The administrator or the like designates the first control target device 1, which the administrator or the like wishes to change the division number, by rows and columns. Also, input the desired number of divisions. In the division number input column 623, the number of divisions that can be input may be displayed in a pull-down manner. In this way, the administrator or the like can select the first control target device 1 and change the division number.

Therefore, if the temperature distribution sensor 311 having more thermopile sensors is mounted, the administrator or the like can change the division number later. Also, by reducing the number of divisions, the load on the management system 8 can be reduced.

Incidentally, there may be controlled the administrator does not set the division number. For example, the number of partitions may be automatically changed using a time zone, a day of the week, a season, or the like.

<Number of Thermopile Sensors>

Figure 26:
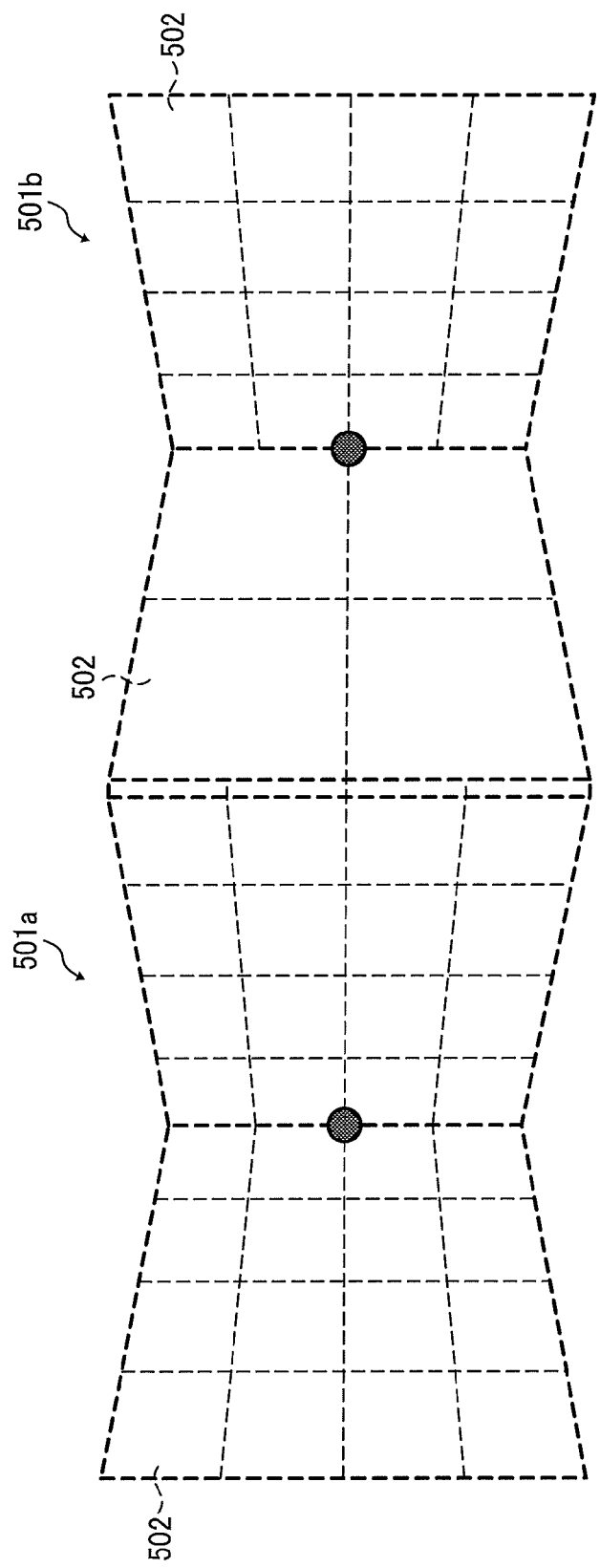
FIG. 26 is a diagram illustrating a detection area.

In addition, the number of thermopile sensors of all the temperature distribution sensors 311 need not be the same. FIG. 26 is an example of a diagram schematically showing a detection area. The number of the detection cell 502 in the detection area 501a is 16, but the number of the detection cells 502 in the detection area 501b is 4. For example, since it is unnecessary to finely detect near a wall or the like, cost can be reduced by adopting the temperature distribution sensor 311 having a small number of thermopile sensors.

<Modifications>

Although the present disclosure has been described above with respect to the drawings, numerous variations and modifications may be made without departing from the scope of the present disclosure.

For example, although the detection data includes heat source data, temperature and humidity data, and illuminance data, other information, such as $CO_2$ concentration, odor, viruses, bacteria, or the like may be detected and included in the detection data.

Also, an LED lighting apparatus is illustrated as an example of the first control target apparatus 1. However, the first control target apparatus 1 is not limited to a lighting apparatus that uses an LED but may be any type of lighting apparatus. For example, an incandescent lamp, a fluorescent lamp, a halogen lamp, a high luminance discharge lamp, or the like may be used as the first control target apparatus 1.

Also, an air conditioner is illustrated as an example of the second control target apparatus 2. However, the second control target apparatus 2 is not limited to an air conditioner with a so-called heat pump but may be any apparatus that influences the sensory temperature and/or humidity. For example, the second control target apparatus 2 may be a simple fan, a dehumidifier, a humidifier, an air cleaner, or some type of heater, but is not limited thereto.

Also, a temperature distribution sensor is used to detect the presence/absence of a person. However, the presence/absence of an animal other than a human being may be determined, for example. That is, any object that generates heat including animals, robots, and the like may be detected. Also, a camera may be used as the temperature distribution sensor. In this case, a moving object may be detected by image processing, and people and/or animals may be detected using infrared rays, for example.

Also, the detection apparatus 3 is not limited to being installed in the first control target apparatus 1 corresponding to a lighting apparatus but may also be installed at other various locations, such as at a ventilation port of an air conditioner, or at a fire alarm device, for example.

Also, the functional configuration of the device control system 100 is not limited to the example configuration as illustrated in FIG. 6. That is, FIG. 6 merely illustrates one example distribution of functions of the device control system 100 to the management system 8, the first control target apparatus 1, and the second control target apparatus 2 to facilitate understanding of process operations implemented by the device control system 100. However, the present disclosure is by no way limited to the illustrated distribution of various process units and various names assigned thereto, for example. Also, processes of the device control system 100, the first control target apparatus 1, and the second control target apparatus 2 may be subdivided into further process units, for example. Also, a process implemented by a process unit may be divided into further process steps, for example.

Also, the device control system 100 may include a plurality of management systems 8, and the functions of the management system 8 may be distributed to a plurality of servers, for example.

Also, one or more of the databases included in the storage unit 8000 of the management system 8 may be provided on the communication network N, for example.

Note that the room α is an example of a predetermined space, the thermopile sensor is an example of a sensing element, the temperature distribution sensor 311 is an example of detection unit, the management system 8 is an example of an information process apparatus, the cell/area correspondence table generation section 83 is an example of information generation unit and the transceiver unit 81 is an example of an acquiring unit. Also, the cell/area conversion unit 85 is an example of a detection result conversion unit and the generation unit 84 is an example of a control data generation unit. The cell/area correspondence table is an example of correspondence information.

In this way, the device control system 100 can not only control air conditioning by detecting a person, but also can appropriately control lighting. As a result, energy saving and comfort can be improved more than before. The device control system 100 can detect a person for each area 9 and can appropriately control individual lighting. As a result, the situation of lighting the light around the person for one person is reduced. It also makes it easy to save energy. Also, the comfort is not reduced since at least the lighting is turned on for the detected person.

Embodiments in accordance with the present disclosure may utilize circuitry, processing circuitry, dedicated hardware or a mixture of dedicated hardware and and/or circuitry executing software stored in internal and/or external memory. For example, the present disclosure may be implemented as one or more networked information processing apparatuses including processing circuitry that executes functionality implemented software in accordance with the present disclosure. Processing apparatuses in accordance with the present disclosure may comprise any suitably programmed apparatuses such as a general purpose computer, personal digital assistant, mobile telephone (such as a WAP or 3G-compliant phone), server, accessory device or other digital device including circuitry.

Aspects of the present disclosure may encompass computer software that is executed by circuitry, processing circuitry, or another programmable device. The computer software may be provided to the programmable device using any storage medium for storing processor readable code such as a floppy disk, hard disk, CD-ROM, magnetic tape device, solid state or other memory device.

Features in accordance with the present disclosure may be stored in a non-transitory computer readable medium. For example, a non-transitory computer readable medium may store computer executable instructions that, when executed by circuitry of an imaging apparatus, cause the circuitry to perform information processing in accordance with the present disclosure.

Moreover, variations and modifications may be made without departing from the scope of the present disclosure.

What is claimed is:

1. A system, comprising:
a plurality of sensors that are installed on a surface, the plurality of sensors including a sensor that is installed so that a detection direction of the sensor is at a non-zero angle from a line normal to the surface, and each sensor of the plurality of sensors forming a detection cell to detect an object; and
an information process apparatus that includes processing circuitry configured to communicate with the sensor;
calculate, for each sensor of the plurality of sensors, a position of a corresponding detection area, in which the sensor detects the object in a predetermined space, according to the non-zero angle and a location of the sensor on the surface;
create correspondence information that associates each detection area of the predetermined space with the corresponding detection cell; and
adjust a number of the detection cells.

2. The system according to claim 1, wherein the processing circuitry calculates the position of a first detection cell according to an angle of a detection direction of the detection element, corresponding to the first detection cell, with respect to the line normal to the surface.

3. The system according to claim 1, wherein the processing circuitry calculates a distance from the sensor to a location of the object.

4. The system according to claim 1, wherein
the processing circuitry, associates the area of the predetermined space with a particular detection cell, and
when positions of the plurality of detection cells are included in at least one of the areas of the predetermined space, the processing circuitry associates the at least one of the areas of the predetermined space with the plurality of detection cells.

5. The system according to claim 1, wherein the total number of the detection cells differs from a total number of the plurality of sensors.

6. The system according to claim 1, wherein the processing circuitry is configured to
acquire a detection result from each of the plurality of sensors;
determine a presence or absence of the object in each of the detection cells according to each detection result; and
generate control data for a device based on the presence or absence of the object for each of the areas.

7. The system according to claim 6, wherein
the device is a lighting device, and
when the object is detected in an area within a predetermined distance from the lighting device, processing circuitry generates the control data so that a light amount of the lighting device is set to be larger than when the object is detected in an area outside the predetermined distance from the lighting device.

8. The system according to claim 1, wherein
the sensor is configured to collect heat source data that indicates the presence or absence of the object, and
the processing circuitry is configured to determine whether the object is in the detection area according to the heat source data.

9. The system according to claim 1, wherein
each sensor of the plurality of sensors is configured to collect heat source data that indicates the presence or absence of the object, and
the processing circuitry is configured to determine whether the object is in a particular detection area corresponding to one sensor of the plurality of sensors according to the heat source data.

10. The system according to claim 7, wherein
each sensor of the plurality of sensors is configured to collect heat source data that indicates the presence or absence of the object, and
the processing circuitry is configured to determine whether the object is in a particular detection area corresponding to one sensor of the plurality of sensors according to the heat source data.

11. The system according to claim 1, wherein the processing circuitry is further configured to
control a display to display an output to a user, and
receive an input from the user to select a particular sensor of the plurality of sensors.

12. An information process apparatus, comprising:
processing circuitry configured to
communicate with a sensor, of a plurality of sensors that are installed on a surface, the sensor installed so that a detection direction of the sensor is at a non-zero angle from a line normal to the surface, and each sensor of the plurality of sensors forming a detection cell to detect an object;
calculate, for each sensor of the plurality of sensors, a position of a corresponding detection area, in which the sensor detects the object in a predetermined space, according to the non-zero angle and a location of the sensor on the surface;
create correspondence information that associates each detection area of the predetermined space with the corresponding detection cell; and
adjust a number of the detection cells.

13. The information processing apparatus according to claim 12, wherein the processing circuitry is configured to communicate with each sensor of the plurality of sensors.

14. The information processing apparatus according to claim 13, wherein
each sensor of the plurality of sensors is configured to collect heat source data that indicates the presence or absence of the object, and
the processing circuitry is configured to determine whether the object is in a particular detection area corresponding to one sensor of the plurality of sensors according to the heat source data.

15. The information processing apparatus according to claim 13, wherein the processing circuitry is configured to
acquire a detection result from each of the plurality of sensors;
determine a presence or absence of the object in each of the detection cells according to each detection result; and
generate control data for a device based on the presence or absence of the object for each of the areas.

16. The information processing apparatus according to claim 15, wherein
the device is a lighting device, and
when the object is detected in an area within a predetermined distance from the lighting device, processing circuitry generates the control data so that a light amount of the lighting device is set to be larger than when the object is detected in an area outside the predetermined distance from the lighting device.

17. The information processing apparatus according to claim 12, wherein
the sensor is configured to collect heat source data that indicates the presence or absence of the object, and
the processing circuitry is configured to determine whether the object is in the detection area according to the heat source data.

18. An information processing method, comprising:
communicating, by processing circuitry of an information processing apparatus, with a sensor of a plurality of sensors that are installed on a surface, the sensor installed so that a detection direction of the sensor is at a non-zero angle from a line normal to the surface, and each sensor of the plurality of sensors forms a detection cell to detect an object;
calculating, by the processing circuitry for each sensor of the plurality of sensors, a position of a corresponding detection area, in which the sensor detects the object in a predetermined space, according to the non-zero angle and a location of the sensor on the surface;
creating, by the processing circuitry, correspondence information that associates each detection area of the predetermined space with the corresponding detection cell; and
adjusting a number of the detection cells.

* * * * *